US010787542B2

(12) United States Patent
Tallia et al.

(10) Patent No.: US 10,787,542 B2
(45) Date of Patent: Sep. 29, 2020

(54) HYBRID MATERIALS AND PROCESS FOR PRODUCTION THEREOF

(71) Applicants: IMPERIAL INNOVATIONS LIMITED, London (GB); UNIVERSITÀ DEGLI STUDI DI MILANO-BICOCCA, Milan (IT)

(72) Inventors: Francesca Tallia, London (GB); Julian Raymond Jones, London (GB); Laura Francesca Cipolla, Milan (IT); Laura Russo, Milan (IT); Gloria Ruth Young, London (GB)

(73) Assignees: IMPERIAL COLLEGE INNOVATIONS LIMITED, London (GB); UNIVERSITÀ DEGLI STUDI DI MILANO—BICOCCA, Milan (IT)

( * ) Notice: Subject to any disclaimer, the term of this patent is extended or adjusted under 35 U.S.C. 154(b) by 0 days.

(21) Appl. No.: 16/089,223

(22) PCT Filed: Mar. 31, 2017

(86) PCT No.: PCT/GB2017/050915
§ 371 (c)(1),
(2) Date: Sep. 27, 2018

(87) PCT Pub. No.: WO2017/168168
PCT Pub. Date: Oct. 5, 2017

(65) Prior Publication Data
US 2019/0112422 A1 Apr. 18, 2019

(30) Foreign Application Priority Data

Mar. 31, 2016 (GB) .................................. 1605446.2

(51) Int. Cl.
C08G 65/20 (2006.01)
C08G 65/22 (2006.01)
(Continued)

(52) U.S. Cl.
CPC ............. *C08G 65/20* (2013.01); *C08G 65/04* (2013.01); *C08G 65/22* (2013.01); *C08G 65/266* (2013.01);
(Continued)

(58) Field of Classification Search
CPC .... C08G 65/04; C08G 65/22; C08G 65/2615; C08G 65/2654; C08G 65/266;
(Continued)

(56) References Cited

U.S. PATENT DOCUMENTS 4,297,401 A 10/1981 Chern et al.
5,180,856 A 1/1993 Stehr et al.
(Continued)

FOREIGN PATENT DOCUMENTS

JP S63178131 A 7/1988
JP H05331279 A 12/1993
(Continued)

OTHER PUBLICATIONS

Taguchi et al., JP 2012-144693 A machine translation in English, Aug. 2, 2012 (Year: 2012).*
(Continued)

*Primary Examiner* — David T Karst
(74) *Attorney, Agent, or Firm* — Brian C. Trinque; Lathrop GPM LLP

(57) ABSTRACT

The invention relates to inorganic-organic hybrid materials comprising interpenetrated organic and inorganic components, wherein the organic component comprises polymer chains formed at least in part by ring-opening polymerization of a cyclic monomer, and processes for the production thereof.

18 Claims, 13 Drawing Sheets

(51) Int. Cl.

| | |
|---|---|
| *C08G 65/26* | (2006.01) |
| *C08L 71/02* | (2006.01) |
| *C08K 3/36* | (2006.01) |
| *C08G 65/04* | (2006.01) |
| *C08K 5/5435* | (2006.01) |
| *C08G 65/336* | (2006.01) |
| *B33Y 70/00* | (2020.01) |

(52) U.S. Cl.
CPC ..... *C08G 65/2615* (2013.01); *C08G 65/2654* (2013.01); *C08K 3/36* (2013.01); *C08K 5/5435* (2013.01); *C08L 71/02* (2013.01); *B33Y 70/00* (2014.12); *C08G 65/336* (2013.01)

(58) Field of Classification Search
CPC ........ C08G 65/20; C08G 65/336; C08K 3/36; C08K 5/5435; C08L 71/02; B33Y 70/00
USPC ....................................................... 525/523
See application file for complete search history.

(56) References Cited

U.S. PATENT DOCUMENTS

| | | |
|---|---|---|
| 6,498,200 B1 | 12/2002 | Suzuki et al. |
| 2009/0318578 A1 | 12/2009 | Verteeg et al. |
| 2010/0184913 A1 | 7/2010 | Ebbrecht et al. |
| 2014/0135453 A1 | 5/2014 | Lee et al. |
| 2016/0053145 A1 | 2/2016 | Lobert et al. |

FOREIGN PATENT DOCUMENTS

| | | | | |
|---|---|---|---|---|
| JP | 2005-336255 A | | 12/2005 | |
| JP | 2012-144693 A | | 8/2012 | |
| JP | 2012144693 A | * | 8/2012 | .............. C08L 71/02 |

OTHER PUBLICATIONS

Fidalgo, A. et al. (2000) "The Structure of Hybrid Gels by Drift and NMR Spectroscopies," J. of Sol-Gel Sci. and Tech. 19(1-3):403-406.

Russo, L. et al. (2013) "Novel Silica/bis(3-aminopropyl) Polyethylene Glycol Inorganic/Organic Hybrids by Sol-Gel Chemistry," Materials Chemistry and Physics 140:168-175.

Connell et al., "Chemical characterisation and fabrication of chitosan-silica hybrid scaffolds with 3-glycidoxypropyl trimethoxysilane", J. Mater. Chem. B 2: 668-680 (2014).

De Luca et al, Resume, 17th CBECIMat—Brazilian Congress of Engineering and Materials Science, Nov. 15-19, 2006.

Innocenzi et al, "New Synthetic Route to (3-Glycidoxypropyl) trimethoxysilane-Based Hybrid Organic—Inorganic Materials", *Chem. Mater.* 11: 1672-1679 (1999).

Rhee et al, "Evaluation of a Novel Poly(ε-caprolactone)—Organosiloxane Hybrid Material for the Potential Application as a Bioactive and Degradable Bone Substitute", *Biomacromolecules* 5: 1575-1579 (2004).

Tallia et al, "Functionalisation of OH groups in polymers for Class II hybrids for bone substitution", Poster—ICFPAM (2013).

Tian et al., "A new poly(ε-caprolactone) containing hybrid ceramer prepared by the sol-gel process", Polymer 37(18): 3983-3987 (1996).

\* cited by examiner (a)

(b)

(a)

(b)

(a)

(b)

(a)

12.3wt% SiO$_2$ (b)

24.7wt% SiO$_2$ (c)

38.7wt% SiO$_2$ (a)

(b)

(a)
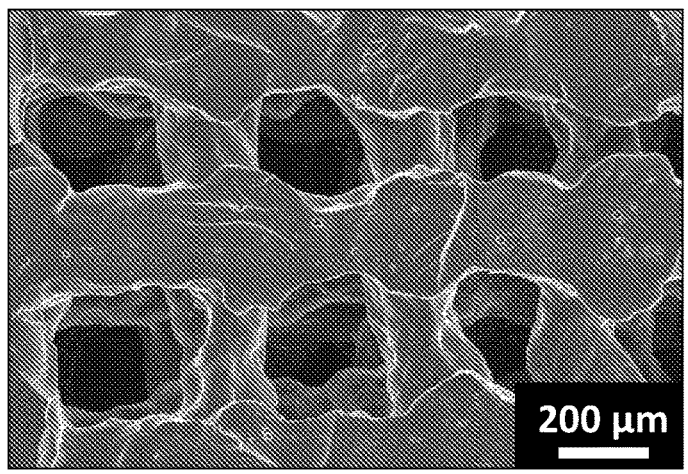
(b)
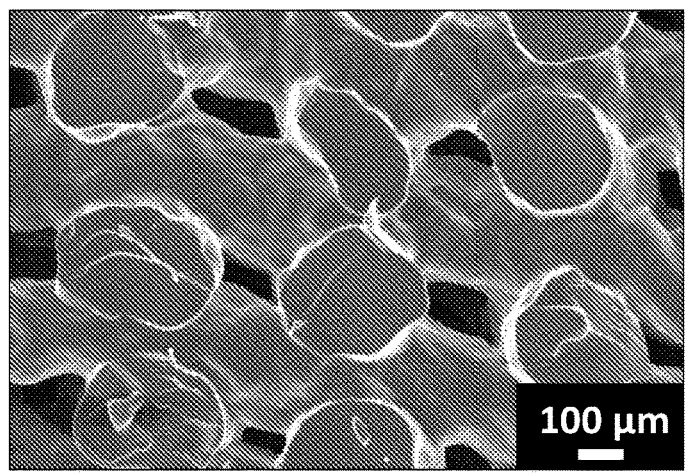
(c)
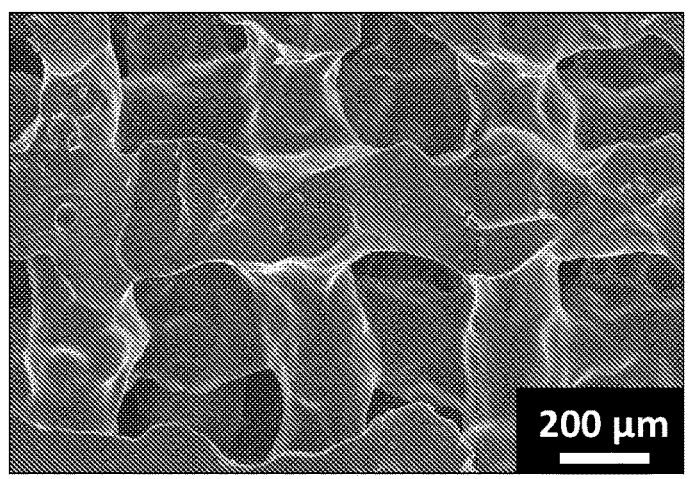
*FIG. 9(a)-(c)*

(d)

HYBRID MATERIALS AND PROCESS FOR PRODUCTION THEREOF

STATEMENT REGARDING SPONSORED RESEARCH

This invention was made with EU government support under REA Grant Agreement No. 289958 awarded by the People Programme (Marie Curie Actions) of the European Union's Seventh Framework Programme (FP7/2007-2013).

RELATED APPLICATIONS

This application is a 35 U.S.C. § 371 filing of International Application No. PCT/GB2017/050915, filed Mar. 31, 2017, which claims priority to Great Britain Patent Application No. 1605446.2, filed Mar. 31, 2016. The entire contents of these applications are incorporated by reference in their entireties.

FIELD OF THE INVENTION

The invention relates to inorganic-organic hybrid materials comprising interpenetrated (co-network) organic and inorganic components and processes for the production thereof.

BACKGROUND

Individually, few materials possess all the physical, chemical and mechanical properties that are required for their application. Therefore, combinations of pure materials (like alloys, composites and blends) are generally used in order to join the single peculiar features of organic (i.e. flexibility, toughness, degradability) and inorganic (i.e. strength, stiffness, resistance to corrosion, bioactivity) components. However, there are well-known drawbacks associated with the use of conventional composites, mainly due to the presence of an interface between distinguishable components. Inorganic-organic (I/O) hybrid materials comprise interpenetrating co-networks of inorganic and organic components that interact at the nanoscale and are indistinguishable above the nanoscale. The fundamental concept of these materials consists of combining the best characteristics of glasses or ceramics and polymers at the molecular level in order to obtain a new material that acts as a single phase with improved, congruent and tailorable properties.

The most popular approach for hybrid synthesis simply consists in modifying the conventional sol-gel process through the addition of a polymer. The sol-gel process involves the hydrolysis and condensation of silica precursors (usually tetraalkyl orthosilicates, i.e. tetraethoxysilane) in the presence of a cosolvent (sol) to form branched silica network which entraps the solvent (gel). Making hybrid materials through the sol-gel process requires the addition of the organic source to the starting sol: this is usually done during condensation process (i.e. after TEOS hydrolysis), so that the inorganic network can entangle with polymer molecules.

Inorganic-organic hybrid materials prepared by solgel process from organically functionalised silane precursors represent an important class of engineered materials. Hybrid materials synthesised from silanes and organic precursors find manifold and diverse applications, including scratch and abrasion resistant coatings, corrosion-prevention coatings, optical waveguides, structured layers for microelectronics, electrically conductive films, adhesive coupling layers for structural joints and fibre-metal laminates, and porous scaffolds for tissue engineering. Synthesis of hybrid materials is complex and there are several chemical challenges that must be overcome.

Hybrids can be classified into five major classes based on their macromolecular structure and the interactions between the inorganic and organic components. Class I and Class II hybrids result from the use of a preformed polymer (prepolymer), which is then embedded in the sol-gel forming inorganic network. Class I hybrids are characterised by weak non-bonding interactions, such as molecular entanglements, hydrogen bonding, electrostatic interactions and/or Van der Waals forces, whereas Class II hybrids contain also strong covalent bonds between inorganic and polymer components. Class III and Class IV hybrids result from the simultaneous formation of the organic (polymerisation) and inorganic (sol-gel process) phases. Class III and IV differentiate by the same distinction between Class I and II: Class III hybrids are characterised by weak non-bonding interactions, whereas Class IV hybrids contain also strong covalent bonds between inorganic and polymer phases. Class V hybrids represent the development of "non-shrinking" sol-gel formulations. The presence of weak non-bonding interactions allows the mobility of polymer chains, giving flexibility and degradability. However, if no covalent linkages are present, usually a lack of improvement of the mechanical properties compared to the ones of the major component is observed, leading to too brittle (in case the inorganic component acts as a matrix) or too weak (in case the polymer is the majority) hybrids. Hence, the introduction of strong covalent cross-links (Class II and IV) between the chains allows a better homogenisation and tailorability of the properties, achieving true interpenetrating "molecular composite" materials. The simplest way to obtain covalently-linked hybrids is using an organic source (preformed polymer or monomer) that contains functionalities able to react with the silica source during the condensation step: for instance, polydimethoxysilane (PDMS) presents a silica backbone with organic side groups, allowing an excellent coupling and resulting high mechanical properties, however PDMS is not biodegradable. Alternatively, Class II-IV hybrids can be obtained using an organic source previously functionalised with a coupling agent before the addition in the sol-gel process: a coupling agent is a molecule that contains both an organic moiety, which is exploited to covalently bond the polymer, and alkoxysilyl moieties which can then undergo the sol-gel process, participating in the formation of the 3D network. The use of a preformed polymer (Class I-II) is generally more common because it avoids the control on the organic polymerisation process. However, incorporating preformed polymers is limited only to polymers which are soluble in the sol-gel solution; furthermore, the shrinkage that occurs during the drying step determines high stresses on the final sample, precluding most moulding applications. These problems can be overcome by forming in situ both inorganic and organic phases (Class III-IV), which allows a greater homogeneity and interpenetration of the two networks but requires the optimisation of their simultaneous formation.

With appropriate properties, hybrid materials could show great promise in numerous applications, for example 3D printing. 3D printing belongs to the Additive Manufacturing (AM) sector, which is defined by ASTM International as the "process of joining materials to make objects from 3D model data, usually layer upon layer, as opposed to subtractive manufacturing methodologies". Additive manufacturing is an emerging technique that will bring great development in numerous fields, like design, automotive and aerospace, architecture and construction, art, sport equipment, jewelry, furniture, microfluidics, electronics, medicine, regenerative medicine, especially orthopaedic and dental applications, and tissue engineering.

One type of 3D printing or robocasting (herein the two terms are used as synonyms) consists in a computer-controlled deposition of a thick slurry, whose consolidation in 3D structures is achieved through a fluid through-gel transition during printing, that can be performed at room temperature or in a controlled chamber. The main challenge of this technique is to develop the right inks or suspensions to print materials with a wider range of chemistries with precision and reproducibility. The ink is generally loaded into a syringe which is placed into the robocaster, connected to a plunger that applies the pressure, determining the extrusion through a nozzle with a selected diameter: the ink must be fluid enough to ensure its flow through the nozzle under a pressure in the range that can be sustained by the machine, but at the same time it must be viscous enough to keep the shape and avoid collapsing after printing.

Generally, it is very challenging to develop a material that permits to achieve a satisfying compromise among the right viscosity of the ink, the designed architecture and shape, the mechanical strength and toughness and the chemical compatibility.

A further desirable class of materials is self-healing materials. These materials possess the ability to repair damage and recover their functionalities using resources inherently available to the system. For instance, bone is a living tissue that continuously remodels and regenerates in response to mechanical loading, showing an exceptional ability to heal small defects generated by everyday life. Materials are naturally subjected to degradation and damages through normal usage and fatigue stress, ultimately failing because of the presence of macro-cracks due to the propagation and coalescence of micro-cracks, which are usually not noticeable with current available detection techniques. Engineering the materials in order to achieve self-repair of those micro-cracks before irreversible damages occur represents a solution to increase the robustness, enhance the performances and prolong lifetime of products and components. Therefore, research into self-healing has become increasingly popular in materials engineering and as a result is now a very broad and complex field.

Self-healing ability can be based on different principles and mechanisms. Repair strategies may work differently depending on the type of damage that occurs in the material. Examples of damage modes are delamination, surface or deep cracking, puncture, scratch, ablation, fiber rupture and debonding, etc., which can affect diverse properties within the material. Therefore, the healing efficiency ($\eta$) of a material is defined by referring to a specific investigated property of the material (f) as described by the following equation:

$$\eta = \frac{f_{Healed}}{f_{Pristine}} \cdot 100\%$$

where $f_{Pristine}$ is the value measured on the undamaged material as such and $f_{Healed}$ is the same property assessed on the damaged material allowed to heal for a predetermined time at an established temperature. Healing efficiency ($\eta$) may be assessed under tensile testing as described in the accompanying examples, for example at room temperature (R.T., 20° C.) and with a predetermined time of 24 hours. Qualitative visual testing by creating a defect using a sharp blade and observing the re-attachment still remains a widely used method to assess autonomous self-healing ability.

One chemical strategy for producing polymeric materials is Ring Opening Polymerisation (ROP). ROP can occur by chain polymerisation through sequential addition of monomers to a growing chain, sometimes with complex and competing mechanisms. When the polymerisation involves positively charged intermediates, the process is usually referred to as Cationic Ring Opening Polymerisation (CROP), largely exploited for the production of several important industrial polymers, such as polysiloxanes, polyacetals, copolymers of 1,3,5-trioxane and oxirane and poly-THF (p(THF), PTHF, poly(tetramethyleneether)glycol)). In general, CROP can be promoted by Lewis acids, Brønsted acids, carbenium and onium ions, photoiniators and covalent initiators, such as epoxides or hydroxy-containing compounds. When polymerisation, e.g. of THF, is performed in the presence of epoxides, such as ethylene oxide (EO) or propylene oxide (PO), copolymers p(THF-EO) and p(THF-PO) can be obtained.

It is desirable to provide hybrid materials with versatile and tailorable physical properties, enabling their use in a multitude of applications, such as in 3D printing or as autonomous self-healing materials, which heal without the release of embedded healing reagents/catalysts or external forces such as heat or light. In this respect, we propose here a new methodology of CROP of THF coupled to the use of GPTMS as the carbofunctional silane, that act as covalent initiator in the presence of a suitable catalyst.

We herein provide a cationic-ring opening polymerisation (CROP) methodology to polymerise cyclic monomers such as tetrahydrofuran (THF), initiated by an activated monomer, which may be performed under mild conditions (R.T.P., acidic catalytic conditions, no reagents in gaseous state). This methodology can be utilised to enable the production of a number of materials via cationic ring-opening polymerisation (CROP), including materials susceptible to 3D-printing, homogeneous inorganic-organic hybrid materials and inorganic-organic hybrid materials with compositional and property gradients, but absent discrete internal boundaries. Moreover this methodology can be utilised to produce inorganic-organic hybrid materials with beneficial mechanical properties, such as elastomeric behaviour, and self-healing properties.

SUMMARY

Accordingly, in a first aspect the invention provides a process for producing a material comprising a polymeric component formed by ring opening polymerisation of cyclic monomer containing at least one ring heteroatom, the process comprising:
(i) forming a reaction mixture comprising cyclic monomer, optionally in the presence of solvent, and an epoxide compound comprising an epoxide ring and an inorganic component;
(ii) adding catalyst to the reaction mixture to activate the epoxide compound and initiate cationic ring-opening polymerisation of the cyclic monomer to produce the material, wherein the material comprises covalent bonds between at least one component of the epoxide compound and the polymeric component.

In any embodiment of the process, the epoxide compound may be an organosilicon epoxide.

The process may further comprise: (iii) hydrolysis and condensation of the reaction mixture formed in step (ii) to produce an inorganic/organic hybrid material. Hydrolysis and condensation may be achieved by addition of an acid and water to the reaction mixture formed in step (ii).

The process may further comprise addition of an additional silica source to the reaction mixture.

In any embodiment of the process, the epoxide may be an (epoxyalkyl)alkoxysilane, for example selected from (3-glycidyloxypropyl)trimethoxysilane (GPTMS); (3-glycidyloxypropyl)triethoxysilane (GPTES); 3-(Glycidoxypropyl) methyldiethoxysilane (GPMDES); 2-(3,4-epoxycyclohexyl) ethyltrimethoxysilane (TRIMO); (3-glycidoxypropyl)-dimethylethoxysilane (GPMES); beta-(3,4-Epoxycyclohexyl)ethyltriethoxysilane (EEES); beta-(3,4-epoxycyclohexyl)ethyltrimethoxysilane (EEMS); and mixtures thereof.

In any embodiment of the process, the cyclic monomer is a cyclic ether, oxetane, acetal, ester (lactones, lactides, and carbonates), oxazolidine, anhydride, amine, amide (lactames), imide, N-carboxyanhydride, 1,3-oxaza derivative, thioether, thiolactone, siloxane, silylether, carbosilane, silanes, phosphate, phosphonates, phosphite, phosphine, phosphazene, or a mixture thereof.

In any embodiment of the process, the cyclic monomer is tetrahydrofuran, tetrahydropyran, tetrahydrothiophene, ε-caprolactone, β-propiolactone, γ-butyrolactone, p-dioxanone, N-methyl-2-pyrrolidone, 2-pyrrolidone (2-Pyrr), 3,6-Dimethyl-1,4-dioxane-2,5-dione, γ-thiobutyrolactone, ε-caprolactame, 2-methyl-2-oxazoline, 3-benzyl-1,3-oxazolidine-2-thione (BOT), 3-benzyl tetrahydro-1,3-oxazolidine-2-thione (BTOT), a cyclic siloxane or a mixture thereof.

In any embodiment of the process, the catalyst is selected from Brønsted Acids, Lewis Acids, carbenium ions, onium ions, or a mixture thereof. The catalyst may be selected from boron trifluoride ($BF_3$), boron trifluoride diethyletherate ($BF_3.OEt_2$); a boron trifluoride complex (e.g. a boron trifluoride complex with methanol, THF or methylsulfide); Iron(III) chloride ($FeCl_3$); Tin(IV) Chloride ($SnCl_4$); Antimony Pentafluoride ($SbF_5$); Fluorosulphuric acid ($FSO_3H$); Trifluorosulfonic acid ($CF_3SO_3H$); Tetrafluoroborate ($HBF_4$); Scandium Triflate ($Sc(OTf)_3$); Ytterbium Triflate ($Yt(OTf)_3$); Trimethylsilyl trifluoromethanesulphonate (TMSOTf); Stannous octoate ($Sn(Oct)_2$); Sulphuric Acid ($H_2SO_4$); Aluminium chloride ($AlCl_3$); and mixtures thereof.

The process may comprise the further step of addition of a carboxylic acid to the reaction mixture prior to addition of catalyst and wherein the material further comprises an organic component formed by the carboxylic acid. The carboxylic acid may be any organic molecule comprising one or more COOH groups. The carboxylic acid may be a carboxylic acid of formula $(HO_2C)-Y-(CO_2H)_n$, or a dimer, trimer or polymer thereof wherein Y is an optionally substituted aliphatic, heteroaliphatic, aryl or heteroaryl moiety; a moiety comprising a combination of two or more components selected from optionally substituted aliphatic, heteroaliphatic, aryl or heteroaryl; or a moiety comprising one or more polymeric components, optionally together with one or more optionally substituted aliphatic, heteroaliphatic, aryl or heteroaryl components; and wherein n is an integer of at least 1. It will be appreciated that when n is 2 or more, —COOH moieties may be attached to the same or different carbon atoms within Y, as valency allows. The one or more polymeric components may be formed from monomers comprising optionally substituted aliphatic, heteroaliphatic, aryl or heteroaryl moieties or moieties comprising any combination thereof.

The carboxylic acid may be PCL-diCOOH of formula:

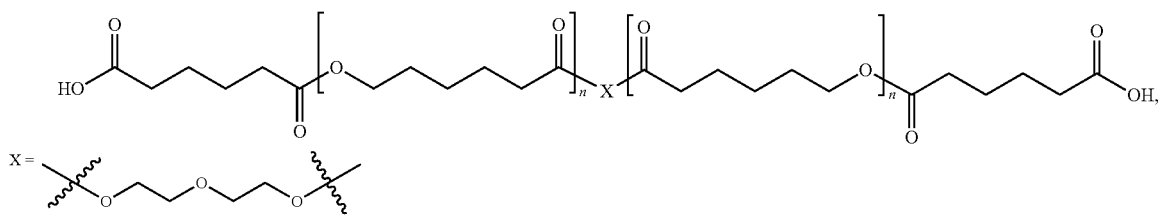

hexadecanedioic acid, hexanedioic acid, benzene-1,2-dicarboxylic acid, benzene-1,3-dicarboxylic acid, benzene-1,4-dicarboxylic acid, propionic acid, poly(ethylene glycol) bis (carboxymethyl) ether, or a mixture thereof.

In any embodiment of the process, the additional silica source is an alkylalkoxy silane, a tetraalkoxysilane or a mixture thereof.

The process may comprise the step of hydrolysis of the additional silica source prior to addition to the reaction mixture.

The process may further comprise addition of one or more oxides, or oxide precursors, to the reaction mixture. This addition may be carried out together with addition of the additional silica source. An oxide may, for example, be an oxide of one or more of Ca, P, Mg, K, Na, B, Al, Zr, Sr, Ti, Zn and Li. Typical precursors include salts and metal alkoxides, for example comprising one or more of Ca, P, Mg, K, Na, B, Al, Zr, Sr, Ti, Zn and Li, such as a calcium alkoxide.

In any embodiment of the process, the monomer may be THF, the epoxide may be GPTMS, a carboxylic acid may be added to the reaction mixture and an additional silica source may be added to the reaction mixture. The carboxylic acid may be PCL-diCOOH and the additional silica source may be TEOS.

In any embodiment of the process, the proportion of TEOS with respect to PCL-diCOOH may be from 0 to 95% w/w, preferably 0-90% w/w or 5-90% w/w.

In another embodiment, the monomer may be THF, the epoxide may be GPTMS, no carboxylic acid is added to the reaction mixture and an additional silica source may be added to the reaction mixture. The additional silica source may be TEOS. The process may comprise the additional step of hydrolysis and condensation of the reaction mixture formed in step (ii) to produce an inorganic/organic hybrid material, wherein the hybrid material has an inorganic content of 2-70 wt %, 2-65 wt %, 2-40 wt %, 10-30 wt %, or, preferably 15-20 wt %.

In any embodiment of the process, the process may further comprise 3D printing of the material.

In any embodiment of the process, the process may further comprise storing the material at a temperature below −40° C., preferably below −80° C. The material may be 3D printed subsequent to such storage.

In another embodiment, the process of the invention enables the preparation of a sample of hybrid material comprising a non-homogeneous inorganic (e.g. $SiO_2$) content. For example, the sample of hybrid material may have a different inorganic content at two or more locations within the sample, Such a sample may therefore comprise at least two regions having different inorganic content, for example comprising a gradient of inorganic content decreasing from one location within the sample to another. The sample preferably comprises no visibly observable discrete interfaces between different regions of the sample. The absence of visibly observable discrete interfaces may be confirmed by SEM. Such a sample may be prepared as described herein, for example by consecutive printing or casting of two or more reaction mixtures according to the process described above, wherein the each of the two or more reaction mixtures has a different ratio of components, so as to produce hybrid material regions with varying inorganic contents.

In a second aspect, the invention provides a material obtainable by a process according to the first aspect of the invention.

In a third aspect, the invention provides an inorganic-organic hybrid material comprising interpenetrated organic and inorganic components with covalent bonds between the organic and inorganic components, wherein the organic component comprises polymer chains formed at least in part by ring-opening polymerisation of a cyclic ether or thioether and the inorganic component comprises silica. The silica will have a three dimensional structure, with the material overall having a 3D hybrid network structure.

The organic component may comprise PTHF or a copolymer thereof.

In some embodiments, the material may have a $SiO_2$ content of 2-70 wt %, 2-65 wt %, 2-40 wt %, 10-30 wt %, or, preferably 15-20 wt %.

The material may comprise a further organic component covalently bonded to at least one component of the hybrid material, the further organic component formed by a carboxylic acid. The carboxylic acid may be any organic molecule comprising one or more COOH groups, for example a carboxylic acid of formula $(HO_2C)-Y-(CO_2H)_n$ as defined herein.

In a fourth aspect, the invention provides an inorganic-organic hybrid material comprising interpenetrated organic and inorganic components with covalent bonds between the organic and inorganic components, wherein the organic component comprises polymer chains formed at least in part by ring-opening polymerisation of a cyclic monomer, and the inorganic component comprises silica, and wherein the material comprises a further covalently bonded organic component formed by a carboxylic acid. The carboxylic acid may be any organic molecule comprising one or more —COOH groups, for example a carboxylic acid of formula $(HO_2C)-Y-(CO_2H)_n$ as defined herein.

The carboxylic acid may be PCL-diCOOH, hexadecanedioic acid, hexanedioic acid, benzene-1,2-dicarboxylic acid, benzene-1,3-dicarboxylic acid, benzene-1,4-dicarboxylic acid, propionic acid, poly(ethylene glycol) bis(carboxymethyl) ether, polyglutamic acid or a mixture thereof, preferably is PCL-diCOOH.

The material may have a $SiO_2$ content of 2 to 70 wt %, 2 to 65 wt %, 2 to 40 wt %, 20 to 65 wt % or 20 to 40 wt %.

The material may have self-healing properties, for example a healing efficiency (17) of 20% or more, preferably 30% or more in relation to strain ($\varepsilon^*$) at failure and or stress ($\sigma^*$) at failure as demonstrated under tensile testing.

The material of the invention may be provided in the form of a sample comprising homogeneous inorganic content and/or homogeneous mechanical properties across the entire sample. Alternatively, the material may be provided in the form of a sample comprising non-homogeneous inorganic content and/or mechanical properties. Such a sample may therefore comprise at least two regions having different inorganic content and/or different mechanical properties. For example, the material may be provided in the form of a sample comprising a gradient of inorganic content decreasing from one region of the sample to another region of the sample and/or a gradient of mechanical properties from one region of the sample to another. The sample preferably comprises no visibly observable discrete interfaces between different regions of the sample.

The invention also provides a device comprising a hybrid material as described herein. The device may comprise hybrid material in the form of a bulk monolith, a porous scaffold, or a combination thereof. The device may comprise a portion of hybrid material in the form of a bulk monolith bonded to a portion of hybrid material in the form of a porous scaffold. Preferable, there is no visibly observable discrete interface between the bulk monolith and scaffold components of the device. This may be confirmed by SEM In an alternative to the process of the first aspect of the invention, the invention provides process for producing a material comprising a polymeric component formed by ring opening polymerisation of cyclic monomer containing at least one ring heteroatom, the process comprising:

(iii) forming a reaction mixture comprising cyclic monomer, optionally in the presence of solvent, and an epoxide;

(iv) adding catalyst to the reaction mixture to activate the epoxide compound and initiate cationic ring-opening polymerisation of the cyclic monomer to produce the material, wherein the material comprises covalent bonds between at least one component of the epoxide compound and the polymeric component, wherein the epoxide compound is an entirely organic epoxide such as glycidyl methyl ether (GME), glycidol, an aliphatic or aromatic diepoxide, for example as commonly used for epoxy resin production (e.g. 1,4-butanediol diglycidyl ether, bisphenol A, S or F diglycidyl ether, aliphatic diglycidyl ethers), or a mixture thereof. Features of the first aspect of the invention apply mutatis mutandis to this alternative aspect of the invention.

DETAILED DESCRIPTION

Figure 1:
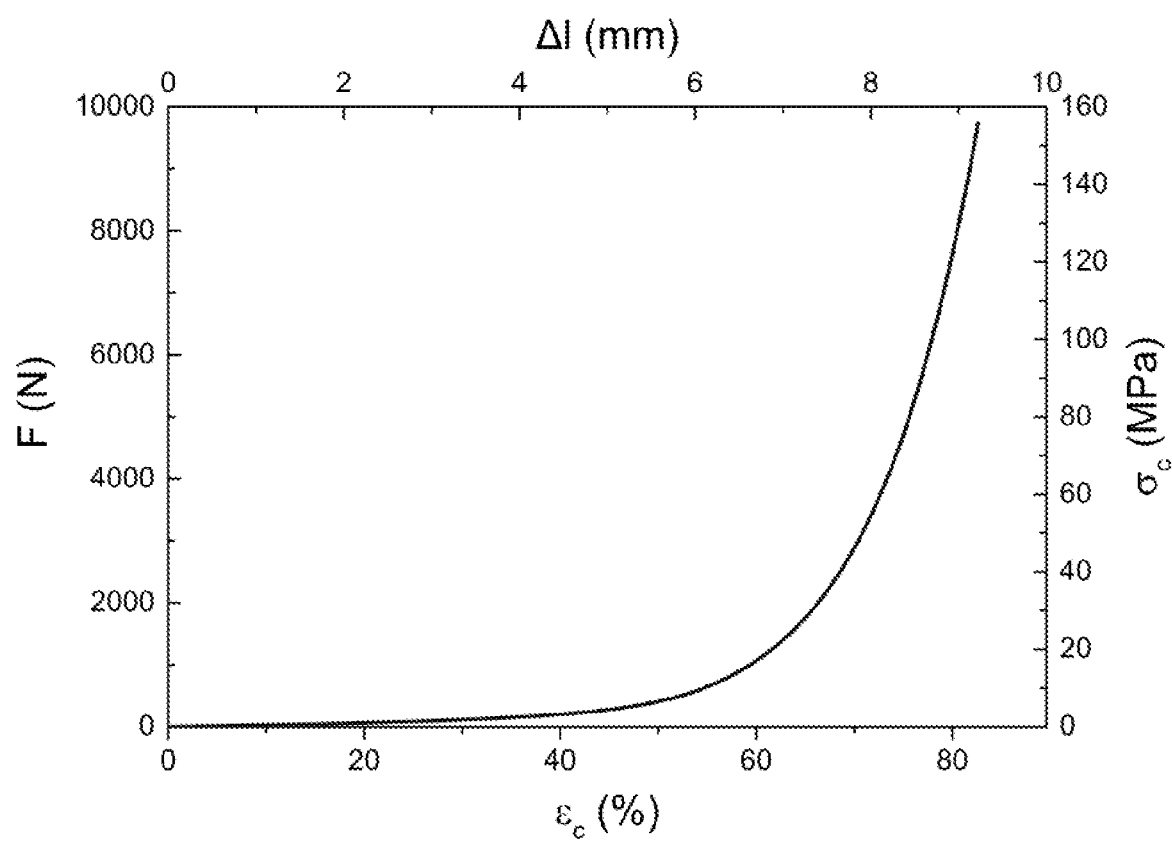
FIG. 1 shows a force-displacement (F-$\Delta$I) and stress-strain ($\sigma$-$\varepsilon$) plot for a $SiO_2$/PTHF hybrid material.

In the context used herein, a cyclic monomer is a cyclic compound which is able to undergo polymerisation under cationic ring-opening polymerisation (CROP) conditions. Cyclic monomers can be employed as unique monomer or in combination and are compounds containing one or more heteroatoms in a ring, wherein the heteroatom may be 0, S, P, N or Si. The ring subject to ring-opening polymerisation is preferably a saturated ring, which may be substituted or unsubstituted. Oxygen-containing cyclic monomers include, for example, ethers, oxetanes, acetals, esters (lactones, lactides, and carbonates), oxazolidines and anhydrides. Nitrogen-containing cyclic monomers include, for example, amines, amides (lactames), imides, N-carboxyanhydrides and 1,3-oxaza derivatives. Sulphur-containing cyclic monomers include, for example, thioethers, thiolactones, sulphides and polysulphides. Silicon-containing cyclic monomers include, for example, siloxanes, silylethers, carbosilanes and silanes. Phosphorus-containing cyclic monomers include, for example, phosphates, phosphonates, phosphites, phosphines and phosphazenes. For example, cyclic monomers may be tetrahydrofuran (THF), tetrahydropyran (THP), tetrahydrothiophene, ε-caprolactone, β-propiolactone, γ-butyrolactone (GBL), β-dioxanone, N-methyl-2-pyrrolidone (NMP), 2-pyrrolidone (2-Pyrr), 3,6-Dimethyl-1,4-dioxane-2,5-dione, γ-thiobutyrolactone, ε-caprolactame, 2-methyl-2-oxazoline, 3-benzyl-1,3-oxazolidine-2-thione (BOT), 3-benzyl tetrahydro-1,3-oxazolidine-2-thione (BTOT), cyclic siloxanes and mixtures thereof.

Where the cyclic monomer is a liquid, for example THF, no solvent is necessary and the monomer itself may act as solvent in the process. Where the monomer is solid, organic solvent or an ionic liquid can be used to dissolve the monomer. The solvent should preferably be one which does not participate in the CROP reaction. Examples of suitable solvents include diethyl ether, chloroform, nitrobenzene, acetonitrile and dimethylformamide.

As used herein, an epoxide is any compound comprising an epoxide ring (i.e. a three-membered cyclic ether). In a process of the invention, the epoxide is activated by interaction with the catalyst, initiating the CROP reaction. In addition, the epoxide acts as a building block for formation of the second component of the material produced by a process of the invention. The epoxide as used in the present invention may be a compound comprising an epoxide and an inorganic component, wherein the inorganic component comprises at least one element that is not carbon, hydrogen, nitrogen or oxygen, for example the inorganic component may comprise silicon or boron. The epoxide may be monocyclic or fused to another ring, preferably an aliphatic ring. For example, the epoxide may be an epoxy-containing silane. In some embodiments, the epoxy-containing silane may be of formula $(R^1)_n—Si(R^2)_{4-n}$, wherein n is 1 or 2, preferably 1, $R^1$ is organic moiety containing an epoxide ring and $R^2$ is aliphatic or $O—R^3$, wherein at least one, preferably at least 2 $R^2$ is $O—R^3$, and $R^3$ is an aliphatic moiety. Examples of epoxy-containing silanes include (3-glycidyloxypropyl)trimethoxysilane (GPTMS), (3-glycidyloxypropyl)triethoxysilane (GPTES), 3-(glycidoxypropyl)methyldiethoxysilane (GPMDES), 2-(3,4-epoxycyclohexyl)ethyltrimethoxysilane (TRIMO), (3-glycidoxypropyl)-dimethylethoxysilane (GPMES), beta-(3,4-epoxycyclohexyl)ethyltriethoxysilane (EEES), beta-(3,4-epoxycyclohexyl)ethyltrimethoxysilane (EEMS), or a mixture thereof. It will be appreciated that an alternative to an epoxide comprising an inorganic component is an entirely organic epoxide such as glycidyl methyl ether (GME), glycidol, an aliphatic or aromatic diepoxide, for example as commonly used for epoxy resin production (e.g. 1,4-butanediol diglycidyl ether, bisphenol A, S or F diglycidyl ether, aliphatic diglycidyl ethers), or a mixture thereof.

In general, CROP can be initiated by a catalyst, for example selected from Lewis acids, Brønsted acids, carbenium ions, onium ions or benzyl bromide. A catalyst may, for example, be selected from boron trifluoride ($BF_3$), boron trifluoride diethyletherate ($BF_3.OEt_2$); a boron trifluoride complex (e.g. a boron trifluoride complex with methanol, THF or methylsulfide); Iron(III) Chloride ($FeCl_3$); Tin(IV) Chloride ($SnCl_4$); Antimony Pentafluoride ($SbF_5$); Fluorosulphuric Acid ($FSO_3H$); Trifluorosulfonic acid ($CF_3SO_3H$); Tetrafluoroborate ($HBF_4$); Scandium Triflate ($Sc(OTf)_3$); Ytterbium Triflate ($Yt(OTf)_3$); Trimethylsilyl trifluoromethanesulphonate (TMSOTf); Stannous octoate ($Sn(Oct)_2$); Sulphuric Acid ($H_2SO_4$); Aluminium chloride ($AlCl_3$); onium ions; carbenium ions; and mixtures thereof. Carbenium ions are ions of formula $R_3C^+$, wherein each R is, for example, independently H, aliphatic or aryl. Exemplary carbenium ions include $(C_6H_5)_3C^+$, $(C_6H_5)_2CH^+$, $(C_6H_5)CH_2^+$, $H_2C=CH—CH_2^+$ and $(CH_3)_3C^+$. The catalyst may, preferably, be $BF_3OEt_2$, $Sc(OTf)_3$, $Yt(OTf)_3$ or TMSOTf. Surprisingly, CROP occurs in the present invention in mild conditions, for example in the absence of an acid halide. Accordingly, preferably the process of the invention may be carried out in a reaction mixture in which no acid halide is present.

The catalyst should preferably be provided to the reaction mixture in an amount sufficient to achieve a complete opening of the epoxide ring to guarantee the best condensation of the network and to avoid epoxy residual. It will be appreciated that the exact amount will be a function of the components of the reaction mixture used in any particular process. For example, it has been determined that where the catalyst is $BF_3.OEt_2$ and the epoxide is GPTMS the amount of catalyst is preferably sufficient to decrease the pH of the reaction mixture to a value of ≤2. Epoxide stability may be correlated to epoxide ring strain, therefore the preferable pH may be higher for more reactive epoxides or lower for more stable epoxides.

An inorganic/organic hybrid material is a material comprising interpenetrating inorganic and organic components. Organic/inorganic hybrids are usually synthesised by first functionalising a polymer with a coupling agent before it is introduced into the sol-gel process. In contrast to the traditional procedure, the present invention produces materials which are obtained via an in situ cationic ring opening polymerisation reaction (CROP) where a polymeric chain is built directly on a precursor (the epoxide compound). The in situ polymerisation can occur under mild conditions (room temperature and pressure (R.T.P., 20° C. and 1 atm), acidic catalytic conditions, no anhydrous conditions, no reagents in gaseous state). The properties of the final hybrid materials may be tuned varying the ratio between the organic and the inorganic components, as a function of the desired application.

The hybrid system results from the reaction of two or more components. In a di-component system to produce, for example, $SiO_2$/polymer hybrids, the reaction methodology used may comprise a double component reaction including epoxide and cyclic monomer in the presence of a suitable catalyst. In a tri-component system to produce, for example, $SiO_2$/polymer/carboxylic acid hybrids, the reaction methodology used may comprise a tri-component reaction, including epoxide, cyclic monomer and carboxylic acid in the presence of a suitable catalyst. In the reaction, epoxide may be dissolved in cyclic monomer or, if the monomer is a solid, a suitable chemically inert solvent (e.g. chloroform, diethyl ether or nitrobenzene) or an ionic liquid may be added. An additional silica source may be added to the reaction mixture, both to di-component and tri-component systems, in order to further tailor the mechanical properties of the hybrid, such as alkylalkoxy silanes or tetraalkoxysilanes. When an additional silica source is added, it is first hydrolysed, then added to the reaction mixture. The reaction mixtures are suitable for 3D-printing techniques: the hybrid may be extruded by a 3D-printer directly from the sol-gel, which is a unique feature, unusual for hybrid materials. The solution may be allowed to stir till homogeneity, then submitted to the sol-gel process and cast in a mould (to get bulk samples) or used for 3D-printing (to get porous structures). The transition to gel state provides properties suitable for printing. Subsequent to gel formation, material can be subjected to aging and drying to produce bulk and porous samples. 3D porous structures may be useful for creating micro/nano-structured systems and complex fluid systems with new functionality, such as microvasculature networks, and microchannels, microfluidic devices, custom-designed scaffolds for tissue regeneration (i.e. bone, cartilage, airway splints). Scaffolds may also be prepared from hybrid materials using sacrificial templating, especially salt leaching.

The sol-gel process is a well-known process in which hydrolysis and condensation of inorganic components occur. For example, in the first stage of the sol-gel process, a silica precursor undergoes hydrolysis through reaction with water under acidic or basic catalysis to form silanol groups. Condensation then occurs where the silicon atoms become cross-linked through bridging oxygen bonds (Si—O—Si) with the loss of a water molecule, forming a silica network.

As described herein, in some embodiments of the invention an additional silica source, distinct to the epoxide compound, is utilized. The additional silica source may, for example, be an alkylalkoxy silane (e.g. methyltrimethoxysilane, dimethyldimethoxysilane and the corresponding methoxy derivatives, 3-aminopropyl triethoxysilane, 3-mercaptopropyl triethoxysilane, 3-aminopropyl trimethoxysilane, 3-mercaptopropyl trimethoxysilane), a tetraalkoxysilanes (e.g. TEOS—tetraethoxysilane, TMOS—tetramethyl orthosilicate), or a mixture thereof.

The process may further comprise addition of one or more oxides, or oxide precursors, to the reaction mixture. In such a process, the inorganic ($SiO_2$) component of the material will also comprise the one or more additional oxides. The one of more oxides or oxide precursors are preferably added to the reaction mixture together with an additional silica source. An oxide may, for example, be an oxide of one or more of Ca, P, Mg, K, Na, B, Al, Zr, Sr, Ti, Zn and Li. Typical precursors include salts and metal alkoxides, for example comprising one or more of Ca, P, Mg, K, Na, B, Al, Zr, Sr, Ti, Zn and Li. For example, typical precursors include: calcium methoxyethoxide (CME), calcium ethoxide, calcium nitrate tetrahydrate, calcium phosphate, triethylphosphate (TEP), tributylphosphate, diethylphosphatoethyltriethoxysilane (DEPETES), zirconium propoxide, nitrates of cations (e.g. of Mg, K, Na, Al, Sr, Zn or Li), chlorides of cations (e.g. of Mg, K, Na, Al, Sr, Zn or Li), tributyl borate, trimethyl borate, boric acid ($H_3BO_3$), titanium (IV) n-butoxide, titanium (IV) isopropoxide, tetrabutyl titanate and lithium citrate.

In a process as described herein, it is possible for a further component, i.e. a carboxylic acid, to be added to the reaction mixture, for example by being dissolved or suspended in the cyclic monomer/solvent before addition of the epoxide. A carboxylic acid may, therefore, be selected to be soluble in the selected cyclic monomer/solvent. The resulting material thereby comprises a third component, which is an organic component formed by the carboxylic acid. The carboxylic acid may be any organic molecule comprising one or more COOH groups. The carboxylic acid may be a carboxylic acid of formula $(HO_2C)$—Y—$(CO_2H)_n$ or a dimer, trimer or polymer thereof, wherein Y is an optionally substituted aliphatic, heteroaliphatic, aryl or heteroaryl moiety; a moiety comprising a combination of two or more components selected from optionally substituted aliphatic, heteroaliphatic, aryl or heteroaryl; or a moiety comprising one or more polymeric components, optionally together with one or more optionally substituted aliphatic, heteroaliphatic, aryl or heteroaryl components; and wherein n is an integer of at least 1, preferably 1 or 2. Accordingly, where n is 0 the carboxylic acid may, for example, be a mono carboxylic acid (Y—COOH) and where n is 1, the carboxylic acid may be a dicarboxylic acid (HOOC—Y—COOH). It will be appreciated that where the carboxylic acid comprises two or more COOH groups, these groups may be attached to different carbon atoms within Y. Y may comprise one or more polymeric components, for example a polyether (such as polyethylene glycol), a polyester (such as polycaprolactone), or a combination thereof. The one or more polymeric components may be formed from monomers comprising optionally substituted aliphatic, heteroaliphatic, aryl or heteroaryl moieties or moieties comprising any combination thereof. It will be appreciated that where the carboxylic acid comprises a polymeric component, the —COOH groups may be bonded directly thereto or via a linker. Furthermore, a linker may be present between polymeric components. The linker may be an optionally substituted aliphatic, heteroaliphatic, aryl or heteroaryl moiety, or a combination thereof.

Exemplary carboxylic acids include:

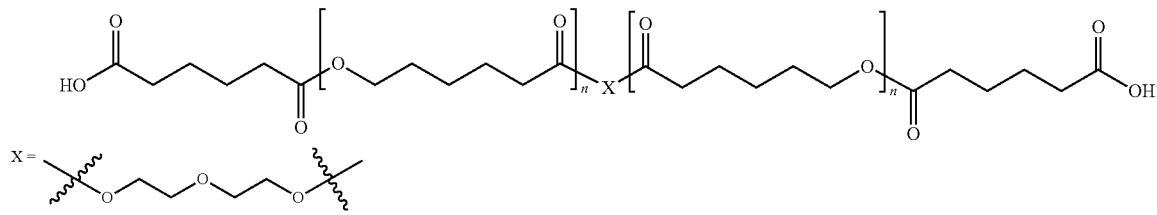

referred to herein as polycaprolactone dicarboxylic acid (PCL-diCOOH), wherein each n may be any integer value of 1 or greater. In some embodiments, each n is an integer of 1 to 20, of 1 to 10, or of 1 to 8. It will be appreciated that in any sample of PCL-diCOOH there may be some variation in the value of n within individual molecules in the sample, so values may represent an average for the sample. Further exemplary carboxylic acids include hexadecanedioic acid, hexanedioic acid, benzene-1,2-dicarboxylic acid, benzene-1,3-dicarboxylic acid, benzene-1,4-dicarboxylic acid, propionic acid and poly(ethylene glycol) bis(carboxymethyl) ether.

In the context used herein, a polymeric component includes any component with 2 or more repeated monomers. Therefore, a polymeric component includes dimeric and trimeric components, as well as components with a monomer repeat of 3 or greater. Polymeric components may, for example, be homopolymeric, copolymeric or terpolymeric.

The carboxylic acid component may contribute to the reactivity of the system. It may act as terminator of the CROP propagation steps, it may compete with monomer polymerisation, giving nucleophilic attack on the activated epoxy-monomer and it may react with the epoxide ring, allowing the formation of an unstable orthoester intermediate that further reacts with the polymer growing chain, acting as terminator step. When the carboxylic acid is a dicarboxylic acid, it can act as cross-linking agent. In all instances, covalent bonding will be formed between the carboxylic acid and other components of the material (the epoxide component, the polymer component, or both). In addition, the carboxylic acid component may participate to the final structure/properties of the material by additional non-bonding interactions (i.e. hydrogen bonding, van der Waals and dipole-dipole interactions, silica intermediates). In some embodiments, this may contribute to self-healing properties.

As used herein, the term "comprises" means "includes, but is not limited to."

The term "aliphatic", as used herein, means a substituted or unsubstituted straight-chain, branched or cyclic hydrocarbon, which is completely saturated or which contains one or more units of unsaturation, but which is not aromatic. Aliphatic groups include substituted or unsubstituted linear, branched or cyclic alkyl, alkenyl, alkynyl groups and hybrids thereof, such as (cycloalkyl)alkyl, (cycloalkenyl)alkyl or (cycloalkyl)alkenyl. In various embodiments, an aliphatic group has 1 to 30, 1 to 20, 1 to 16, 1 to 12 or 1 to 6 carbons. When an aliphatic group is present in a linker moiety it preferably has 1 to 12 or 1 to 6 carbons. The term "heteroaliphatic" means an aliphatic group as defined above in which one or more carbon atom is replaced by a heteroatom. The term "heteroatom" refers to nitrogen (N), oxygen (O), or sulfur (S).

The term "aryl" refers to a $C_{6-14}$ (preferably $C_{6-10}$) aromatic hydrocarbon, comprising one to three rings, each of which is optionally substituted. Aryl groups include, without limitation, phenyl, naphthyl, and anthracenyl. In some embodiments, two adjacent substituents on an aryl ring, taken together with the intervening ring atoms, form an optionally substituted fused 5- to 6-membered aromatic or 4- to 8-membered non-aromatic ring having 0-3 ring heteroatoms selected from the group consisting of N, O and S. Thus, the term "aryl", as used herein, includes groups in which an aromatic ring is fused to one or more heteroaryl, cycloaliphatic, or heterocyclic rings.

The terms "heteroaryl" and "heteroar-" refer to an aromatic group having 5 to 14 ring atoms, preferably 5, 6, 9, or 10 ring atoms and having, in addition to carbon atoms, from one to four heteroatoms as ring atoms. The term "heteroatom" refers to N, O, or S. In some embodiments, two adjacent substituents on the heteroaryl, taken together with the intervening ring atoms, form an optionally substituted fused 5- to 6-membered aromatic or 4- to 8-membered non-aromatic ring having 0-3 ring heteroatoms selected from the group consisting of N, O and S. Thus, the terms "heteroaryl" and "heteroar-", as used herein, also include groups in which a heteroaromatic ring is fused to one or more aromatic, cycloaliphatic, or heterocyclic rings.

The term "alkoxide" refers to a compound ROM, wherein M is a metal or other cationic species. R may be any organic moiety, for example an aliphatic, heteroaliphatic, aryl, or heteroaryl moiety, or a moiety comprising a combination thereof, any of which may optionally be substituted.

The term "substituted", as used herein, means that a hydrogen radical of a designated moiety is replaced with the radical of a specified substituent, provided that the substitution results in a stable or chemically feasible compound. The phrase "one or more substituents", as used herein, refers to a number of substituents that equals from one to the maximum number of substituents possible based on the number of available bonding sites. Unless otherwise indicated, where multiple substituents are present, substituents may be either the same or different.

An aryl or heteroaryl group may be optionally substituted. Suitable substituents on the unsaturated carbon atom of an aryl or heteroaryl group include halo, —NO₂, —CN, N═C═O, —C(R')═C(R')₂, —C≡C—R', —OR', —SR', —S(O)R', —SO₂R', —SO₃R', —SO₂N(R')₂, —N(R')₂, —NR'C(O)R', —NR'C(O)N(R')₂, —NR'CO₂R', —NR'SO₂R', —NR'SO₂N(R')₂, —O—C(O)R', —O—CO₂R', —OC(O)N(R'), —C(O)R', —CO₂R', —C(O)N(R')₂, —P(O)(R')₂, —P(O)(OR')₂, —O—P(O)—OR', wherein R', independently, is hydrogen or an optionally substituted aliphatic, heteroaliphatic, aryl or heteroaryl moiety, or two occurrences of R' are taken together with their intervening atom(s) to form an optionally substituted 5-7-membered aryl, heteroaryl, cycloaliphatic, or heterocyclic ring.

An aliphatic or heteroaliphatic group, including carbocyclic or heterocyclic rings, may be "optionally substituted". Unless otherwise defined, suitable substituents on the saturated carbon of an optionally substituted aliphatic or heteroaliphatic group, are selected from those listed above for the unsaturated carbon of an aryl or heteroaryl group and additionally include the following: =O, =S, =C(R")$_2$, where R" is hydrogen or an optionally substituted C$_{1-6}$ aliphatic group.

In addition to the substituents defined above, optional substituents on the nitrogen of a non-aromatic heterocyclic ring also include and are generally selected from R', —N(R')$_2$, —C(O)R', —C(O)OR', —S(O)$_2$R', —S(O)$_2$N(R')$_2$, wherein each R' is defined above. A ring nitrogen atom of a heteroaryl or non-aromatic heterocyclic ring also may be oxidized to form the corresponding N-hydroxy or N-oxide compound.

Stress and strain for a material sample can be calculated in two different ways, as engineering (or conventional) stress and strain or as true (or real) stress and strain.

Engineering (or conventional) stress and strain values are based on the assumption that the cross-section of a sample of material can be considered unvaried during the test, therefore they are usually applied for materials which are not significantly deformable, e.g. ceramics:

- Strain: $\varepsilon_c = \Delta l/l_0$ ($l_0$ is the initial height of the sample and $\Delta l$ is the displacement measured during the test; they are in the same unit of measurement, therefore $\varepsilon_c$ is a value between 0 and 1, it could be reported in % by multiplying for 100).
- Stress: $\sigma_c = F/A$ (F is usually measured in N; A is usually measured in mm$^2$. Given that, $\sigma_c$ results in MPa).

True (or real) stress and strain values are usually applied for highly deformable materials in order to keep into consideration the necking of the sample in tension and the barrelling of the sample in compression, e.g. polymers:

- Strain: $\varepsilon^* = \ln(1+\varepsilon_c)$ (same unit of measurement of $\varepsilon_c$→value between 0-1 or reported in %)
- Stress: $\sigma^* = \sigma_c(1+\varepsilon_c)$ (same unit of measurement of $\sigma_c$→MPa)

Unless otherwise referred to herein, the organic and inorganic wt % contents of a material may be determined by TGA or TGA/DSC as described herein. Depending on the components of the material, the inorganic content may equate to the SiO$_2$ content or the combined content of SiO$_2$ and other oxide components, such as CaO and/or P$_2$O$_5$.

A material produced according to the invention may be useful for applications including tissue regeneration and tissue engineering (e.g. osteochondral regeneration, vascular endoprothesis, intervertebral discs, bone void filler, surgical mesh, splints); Medical devices (e.g. catheters or catheter coatings, contact lenses, diagnostic/therapeutic nanoparticles); materials for automotive and aerospace applications (e.g. abrasive-resistant materials, helmet visors, anti-scratch coatings); building materials; coatings; textiles (finishing or coating); cosmetics; materials for use in electronic devices and non-linear optics (e.g. laser); ITC field; insulating materials (e.g. electrical insulation); materials for sport equipment.

EXAMPLES

Abbreviations

DMA Dynamic Mechanical Analysis
EDS Energy-Dispersive X-ray Spectroscopy
FTIR Fourier-Transform Infrared Spectroscopy
ICP Inductively Coupled Plasma elemental analysis
Maldi-TOF Matrix-Assisted Laser Desorption Ionization Time-of-flight spectroscopy
NMR Nuclear Magnetic Resonance
PBS Phosphate Buffered Saline solution
PTFE Polytetrafluoroethylene
PTHF Polytetrahydrofuran (or poly(tetramethylene ether) glycol), also referred to as p(THF)
SBF Simulated Body Fluid
SEM Scanning Electron Microscopy
TEM Transmission Electron Microscopy
TGA Thermogravimetric Analysis
TGA/DSC Thermogravimetric Analysis/Differential Scanning Calorimetry
μCT Micro Computed Tomography
XRD X-Ray Diffraction analysis
Materials:

Glycidyl methyl ether (GME—CAS number 930-37-0) was purchased from TCI America, US, and used as received. Boron trifluoride diethyletherate (BF$_3$.OEt$_2$—CAS number 109-63-67), anhydrous tetrahydrofuran (THF—CAS number 109-99-9), (3-glycidyloxypropyl)trimethoxysilane (GPTMS—CAS number 2530-83-8), tetraethoxysilane (TEOS—CAS number 78-10-4), 1M hydrochloric acid (1M HCl) were purchased from Sigma-Aldrich, UK, and used as received.

Example 1: PTHF Synthesis

PTHF was synthesized from tetrahydrofuran (THF) in a 1-step procedure, catalysed by the Lewis acid boron trifluoride etherate (BF$_3$.OEt$_2$) and glycidyl methyl ether (GME) as an initiator.

In a typical procedure, GME (1 mol) was dissolved in anhydrous THF (35 mol) at room temperature under continuous stirring in a round-bottom flask. The solution remained completely clear and transparent and, after 15-30 minutes, BF$_3$.OEt$_2$ (0.25 mol, catalytic amount) was added. The reaction occurred very fast, since a sudden temperature increase and occasionally a change in colour (from transparent to yellow) were observed, followed by a fast increase in viscosity due to the rapid polymerisation of THF.

Due to the differences in ring strain of THF (5.63 kcal/mol) and oxiranes (27.28 kcal/mol), it is hypothesized that the epoxide ring is first activated by the Lewis acid to the corresponding intermediate 1 (step I, Scheme 1). This then undergoes nucleophilic attack by the THF oxygen, affording the intermediate 2 and initiating ring opening polymerisation (CROP—step II, Scheme 1) and chain elongation steps (steps Ill-VI, Scheme 1). The polymerisation occurs at room temperature (R.T.), ambient pressure, and in short reaction time.

After polymerisation was complete, residual unreacted THF was removed by drying in air/under vacuum at room temperature. Homogeneous polymer is obtained.

Scheme 1. Hypothesised reaction mechanism for THF polymerisation.

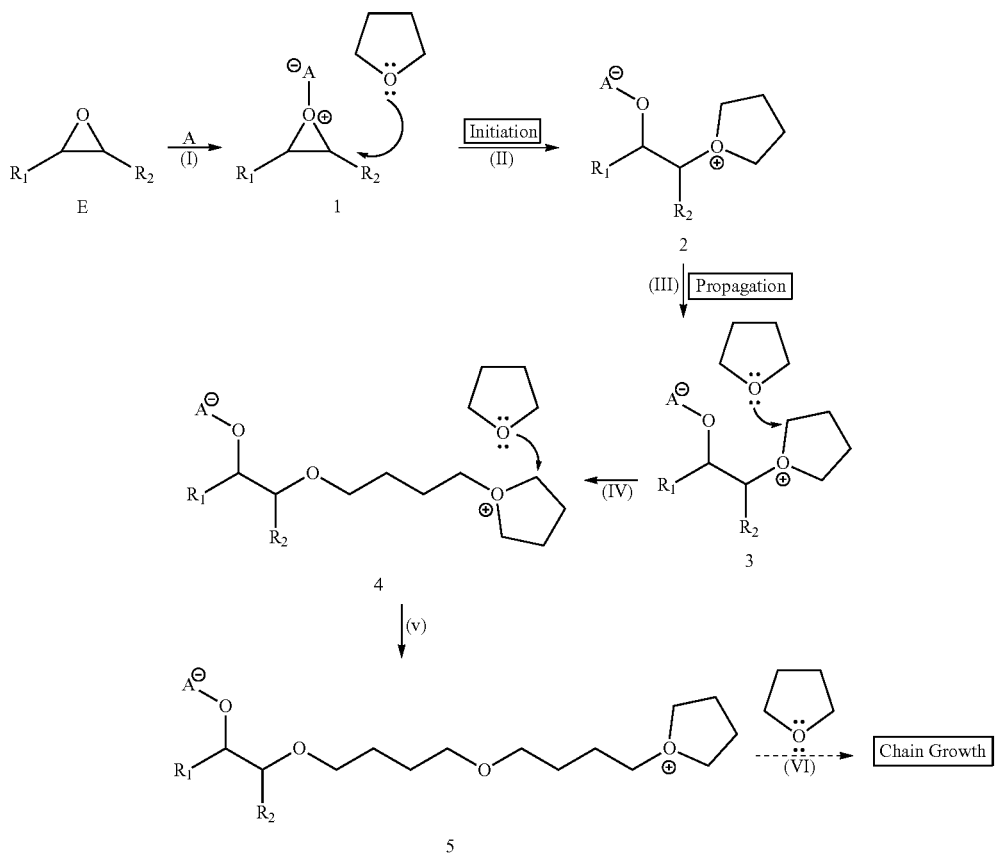

It will be appreciated that the polymerisation mechanism above can be extended to the other cyclic monomers as described herein, which can polymerise via cationic ring-opening polymerisation. If the monomer is a solid, a suitable chemically inert solvent (e.g. chloroform, diethyl ether, nitrobenzene or an ionic liquid) may be added. In addition, GME may be substituted, for example, by aliphatic and aromatic di-epoxides giving rise to copolymers. In addition, whilst anhydrous THF was used in the examples herein, THF being anhydrous is not a mandatory requirement. The CROP reaction works also with non-anhydrous cyclic monomers.

Example 2: Synthesis of $SiO_2$/PTHF Inorganic-Organic Hybrid Materials

Samples were prepared with GPTMS as the sole silica source and also with TEOS as an additional silica source. The synthesis of $SiO_2$/PTHF hybrids was achieved through a 2-step procedure involving:
  Coupling with GPTMS to form a GPTMS-PTHF gel—polymerisation of THF initiated by the epoxide ring of GPTMS, activated by the interaction with $BF_3.OEt_2$.
  Hybrid synthesis by hydrolysis and condensation (sol-gel route)—addition of TEOS (optional), deionised water and 1M HCl.

The formation of GPTMS-PTHF gel is due to THF polymerisation, the rate of which is influenced by THF:GPTMS ratio. A wide range of THF:GPTMS concentrations allows hybrid materials to be produced. Preferably, THF is in excess with respect to the volume that polymerises. When higher THF/GPTMS ratios are used, the THF consumption in the polymerisation reaction is slowed down, such that THF itself may also act as solvent of the system, promoting formation of homogeneous solution. This is preferable particularly when an additional silica source is included in the reaction. By means of example, materials with GPTMS as silica source were prepared according to the procedure below with THF:GPTMS ratios from 35:1 to 65:1 mol and hybrids that have GPTMS and TEOS as silica source were prepared with THF:GPTMS from 65:1 to 100:1 mol.

Preparation of Hydrolysis Solution

TEOS (from 0 to 25:1=TEOS:GPTMS molar ratio) was placed in a beaker with deionised water and 1M HCl. Water content was calculated as the sum of the stoichiometric amounts needed to hydrolyse both TEOS and GPTMS, which means $H_2O$:TEOS=4:1 molar ratio and $H_2O$:GPTMS=3:1 molar ratio. 1M HCl was added at a concentration of 1M HCl:water=1:3% v/v. The resultant mixture was vigorously stirred for 1-1.5 h to induce complete hydrolysis.

In exemplary synthesis 1, a TEOS:GPTMS molar ratio of 5:1 was employed. In exemplary synthesis 2, no TEOS was added, so the hydrolysis solution required only deionised water and the 1M HCl needed to hydrolyse GPTMS.

Formation of GPTMS-PTHF Gel

After 45 minutes from starting preparation of the hydrolysis, GPTMS (1 mol) was dissolved in THF at R.T. under continuous stirring. For exemplary synthesis 1, THF:

GPTMS=100:1 mol was used and for exemplary synthesis 2, THF:GPTMS=65:1 was used. The solution remained completely clear and transparent and, after 15 minutes, 0.25 moles of $BF_3.OEt_2$ was added. A sudden temperature increase, occasionally a change in colour (from transparent to yellow) and the formation of bubbles were observed, followed by a fast increase of the viscosity, indicating a rapid polymerisation of THF initiated by the activation of epoxide ring by $BF_3.OEt_2$, leading to the formation of the GPTMS-PTHF network dissolved in the non-polymerised THF. The polymer solution was allowed to stir for 20 minutes.

Formation of Hybrid Sol

The hydrolysis solution was added dropwise to the GPTMS-PTHF solution and stirred at room temperature for 15-30 minutes to form the hybrid sols.

Formation of Bulk Samples

The hybrid sol was cast into PTFE containers with the desired shape (e.g. cylinders, disks), sealed and placed at 40° C. for three days: this step allowed the gelation (which occurred between few minutes-24 h depending on the starting amount of THF) and the following ageing in order to consolidate the hybrid network. After three days, the lids were loosened and the samples were dried at 40-60° C. over the course of 1-4 weeks, depending on the shape and the amount of starting THF: thicker samples required longer and more careful drying in order to avoid cracking due to a too fast solvent evaporation. When completely dried, samples were taken out from the oven and finally rinsed with deionised water, in order to remove reaction by-products, and used for further characterisations.

Compression testing was carried out, with the following parameters:
- 5 cylindrical samples (diameter (Ø)=8.8-8.9 mm; height ($l_0$)≈10-11 mm)
- v=1 mm/min (displacement-controlled test)
- Load cell=10 kN A force-displacement and stress-strain curve obtained for a sample with Ø=8.897 mm; $l_0$=11.16 mm is shown in FIG. 1. The plot in FIG. 1 reports:

x-axis→$\varepsilon_c$=100% ($\Delta l$ [mm]/$l_0$ [mm]), wherein $\Delta l$ is the displacement measured during the test and $l_0$ is the initial height of the sample→conventional or engineering strain, which is the variation in thickness of the sample, without considering the effect of barrelling during the test.

y-axis→the same curve can be related to the actual force in N applied by the machine (identified with F, measured in N) or to the conventional or engineering stress (identified with $\sigma_c$, measured in MPa) calculated as follows:

$$\sigma_c[MPa] = F[N]/A[mm^2]$$

where A is the area/surface of the sample. $\sigma_c$ does not take into consideration the barreling of the sample.

Evident from the plot is a true elastomeric behaviour. All five samples gave very similar behaviour (standard deviation is very small), being compressed up to more than 80% without breaking. The test was stopped because the max F applicable from the machine (10 kN) was achieved. Values of force and stress measured at different levels of strain are shown in the table below:

|  | Conventional Strain $\varepsilon_c = \Delta l$ [mm]/$l_0$ [mm] | | | | |
| --- | --- | --- | --- | --- | --- |
|  | 10% | 20% | 30% | 40% | 50% |
| Avg F [N] | 28.2 | 62.7 | 113.2 | 197.2 | 401.7 |
| Std Dev [N] ([%]) | 0.7 (2.6) | 1.5 (2.4) | 3.1 (2.7) | 6.9 (3.5) | 18.9 (4.7) |
| Avg $\sigma_c$ [MPa] | 0.5 | 1.0 | 1.8 | 3.2 | 6.5 |
| Std Dev [MPa] ([%]) | 0.01 (2.2) | 0.02 (2.0) | 0.04 (2.3) | 0.1 (3.0) | 0.3 (4.3) |

|  | Conventional Strain $\varepsilon_c = \Delta l$ [mm]/$l_0$ [mm] | | | |
| --- | --- | --- | --- | --- |
|  | 60% | 70% | 80% | Max (83.25 ± 0.57%) |
| Avg F [N] | 1048.5 | 2827.3 | 7300.9 | 9731.0 |
| Std Dev [N] ([%]) | 49.6 (4.7) | 112.6 (4.0) | 320.5 (4.4) | 3.2 (0.03) |
| Avg $\sigma_c$ [MPa] | 17.0 | 45.8 | 118.2 | 157.5 |
| Std Dev [MPa] ([%]) | 0.7 (4.3) | 1.6 (3.6) | 4.7 (4.0) | 1.3 (0.8) |

Example 3: Compression Testing on SiO$_2$/PTHF Hybrids

The two SiO$_2$/PTHF hybrids prepared in syntheses 1 and 2 of Example 2 were prepared in the form of a disk of 3-4 mm thickness.

Synthesis 2, not containing TEOS, resulted in a very flexible sample containing around 3% wt of SiO$_2$ (checked with TGA), with the remainder of the material being PTHF (demonstrated with $^1$H-NMR and FTIR).

Synthesis 1, containing TEOS, resulted in a transparent, flexible but tough sample. TGA was performed to check the inorganic/organic content (this was found to be SiO$_2$/PTHF—17/83 wt %) and $^1$H-NMR and FTIR confirmed the presence of PTHF. A 3-day cell attachment test with chondrocytes also gave promising results.

Full recovery of the initial height was successfully achieved after the test.

The results indicate this material is very promising with a view to applying it as substitute for meniscus/intervertebral disc.

Example 4: Additional Synthesis of SiO$_2$/PTHF Inorganic-Organic Hybrid Materials SiO$_2$/PTHF inorganic-organic hybrid materials were prepared as cylindrical monoliths with a gradient of silica content and mechanical properties along the longitudinal axis, but with no observable discrete boundaries or interfaces between any regions within the monoliths.

Preparation

The protocol as described in Example 2 was carried out, using a TEOS:GPTMS ratio of 20:1 and a THF:GPTMS ratio of 100:1 mol. The sol (identified as "sol 1") was cast in a cylindrical mould, in order to fill approximately half of the mould, and left to gel for 1-2 hours.

While sol 1 was gelling, a second solution with a TEOS: GPTMS ratio of 5:1 (THF:GPTMS ratio of 100:1 mol) was prepared following the same protocol described in Example 2. This sol ("sol 2") was then cast on top of sol 1, already partially gelled, in order to fill the mould.

The combined samples were then aged and dried as described in Example 2.

As well as cylindrical samples, discs with a concentric gradient were produced by first casting the core (delimitated by a ring of PTFE sheet) of sol 1, removing the PTFE sheet after 1-2 hours of gelation and then casting sol 2 around the sol 1 core.

It is to be noted that the TEOS:GPTMS ratio can be varied depending on the desired properties and, additionally, more than 2 solutions can be prepared and "stacked" on top of each other in order to increase the gradient of properties. Moreover, a corresponding protocol can be applied for a tri-component system containing a dicarboxylic acid, such as described in Example 5.

Results

Clear and colourless cylindrical/disc bulk samples were obtained. Visually, the samples appeared homogeneous. No interface or boundary was evident between the two phases when visually observed (This is illustrated for a cylindrical sample in FIG. 2).

Figure 2:
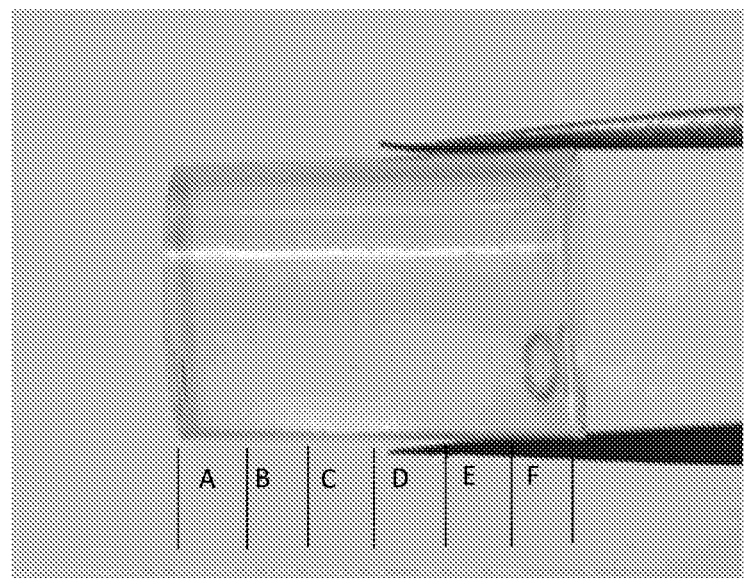
FIG. 2 shows a photograph and a schematic representation of a cylindrical $SiO_2$/PTHF hybrid material with an inorganic content gradient, demarcated into six sections.
Figure 2:
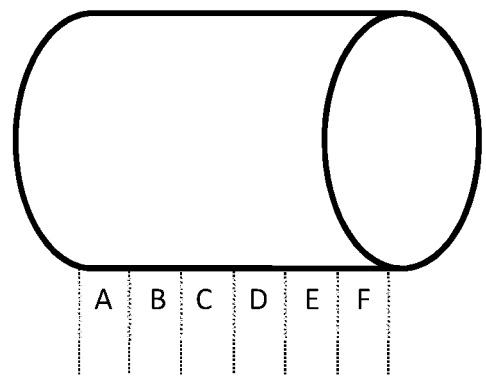

The cylindrical sample was divided into six sections, marked A-F in FIG. 2 and tested with TGA to check the inorganic/organic content of each section, obtaining the following values:

| Section | $SiO_2$ content (wt %) |
|---|---|
| A | 40.3 |
| B | 40.2 |
| C | 40.0 |
| D | 28.8 |
| E | 23.9 |
| F | 23.6 |

In the illustrated sample, the portion of the sample corresponding to sections A-C was predominantly derived from sol 1 and the portion corresponding to sections D-F was predominantly derived from sol 2. The TGA values indicate a transition around the middle of the sample (between sections C and D), proving that the two sols did not simply mix during ageing and drying, but chemically bonded in order to give a single continuous material. The presence of a continuous material and the absence of any discrete interface between the two portions of the sample was confirmed with SEM imaging.

Figure 3:
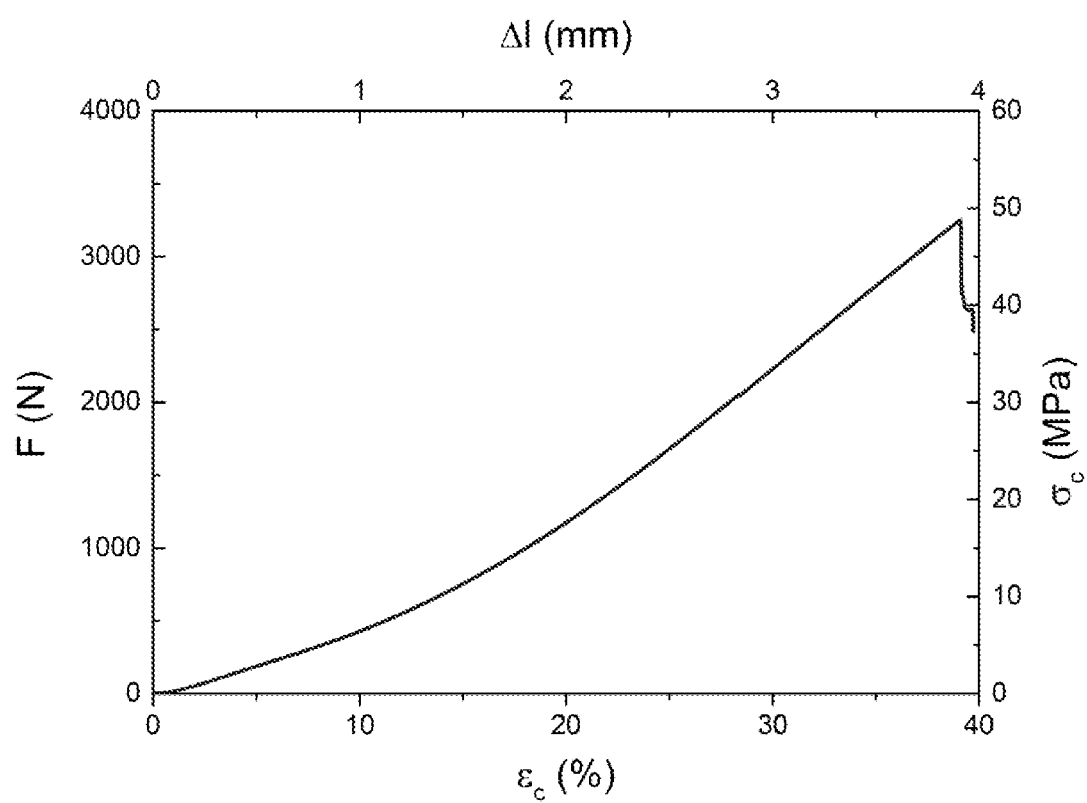
FIG. 3 shows a force-displacement (F-$\Delta$I) and stress-strain ($\sigma$-$\varepsilon$) plot for a $SiO_2$/PTHF hybrid material with an inorganic content gradient.

The samples were compressed uniaxially with the same setup described in Example 3. A stress-strain curve obtained for a cylindrical sample prepared as described above is shown in FIG. 3.

It is evident that the two phases were strongly chemically bonded together as they did not detach under compression and there are not abrupt variations in the stress-strain plot. At high strain, the difference in the mechanical response along the longitudinal axis (extending through sections A-F) was visually observable, with the portion of the sample having a lower inorganic content (more polymeric character, broadly corresponding to sections D-F) deforming more than the portion of the sample having a higher inorganic content (more glassy character, broadly corresponding to sections A-C).

A device made of a single material with a gradient of physical properties has great potential in application such as intervertebral disc substitutes. In this case, a non-degradable material (e.g. a bi-component $SiO_2$/PTHF material) may be preferable as it is very difficult to regenerate a whole intervertebral disc given its dimensions, its position in the human body and its essential functions (shock-absorber; joint between vertebrae; allowing mobility of the spine).

Example 5: Preparation of Tri-Component System $SiO_2$/PTHF/PCL-diCOOH Hybrids $SiO_2$/PTHF/PCL-diCOOH hybrid materials were prepared. The materials showed very versatile and tailorable properties (by varying the organic/inorganic ratio) and autonomous self-healing properties (i.e. healing occurred without requiring the release of any encapsulated or embedded healing reagent/catalyst or external agent such as heat or light).

In the following example, the synthesis of $SiO_2$/PTHF/PCL-diCOOH hybrid was carried out using the following 3-step procedure:
 a) Oxidation of PCL-diol with TEMPO to give PCL-diCOOH
 b) Coupling with GPTMS—polymerisation of THF catalysed by the activated epoxide ring, which is part of GPTMS, leading to the combination of PCL-diCOOH-THF-GPTMS-$BF_3$.$OEt_2$
 c) Hybrid synthesis by hydrolysis and condensation (sol-gel route)—addition of TEOS (optional), deionised water and 1M HCl to the system It will be appreciated that a carboxylic acid could be provided directly, in which case oxidation step a) is not required.

Oxidation of Polycaprolactone (PCL) Diol

Polycaprolactone diol (PCL-diol) as used herein is a compound of formula:

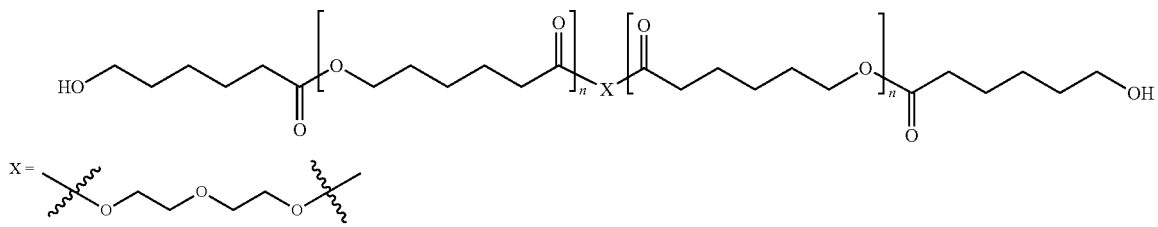

The PCL-diol used in this example had average $M_n$ of 530 Da. Experiments were also carried out with PCL-diol of avg $M_n$ 2000.

PCL-diol was processed to oxidise hydroxyl end-groups (OH) into carboxylic acid end-groups (COOH), obtaining PCL-diCOOH, of formula:

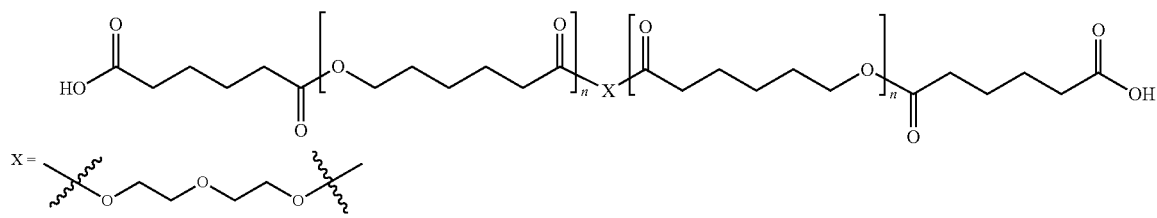

PCL-diol (avg $M_n$=~530 Da—CAS number 36890-68-3), anhydrous acetonitrile (CAS number 75-05-8), sodium bicarbonate (NaHCO$_3$—CAS number 144-55-8), potassium bromide (KBr—CAS number 7758-02-3), TEMPO (CAS number 2564-83-2), hydrochloric acid (HCl, 37% v/v—CAS number 7647-01-0), ethyl acetate (CAS number 141-78-6), sodium sulphate (Na$_2$SO$_4$—CAS number 7757-82-6) were purchased from Sigma-Aldrich, UK, and used as received. Sodium hypochlorite (NaOCl, 3.5% v/v Cl$_2$ in aqueous solution—CAS number 7681-52-9) was purchased from VWR International, UK, and used as received.

In a typical oxidation process, PCL-diol ($M_n$ of 530 Da) was dissolved in anhydrous acetonitrile (15.3 mL g$^{-1}$ with respect to PCL) at R.T. temperature under continuous stirring in a round-bottom flask. Simultaneously, three separate solutions were prepared:

saturated solution of NaHCO$_3$ in deionised water (4.1 mL g$^{-1}$ with respect to PCL);

0.5M solution of KBr in deionised water (1.51 mL g$^{-1}$ with respect to PCL);

0.1M solution of TEMPO in anhydrous acetonitrile (3.77 mL g$^{-1}$ with respect to PCL).

When PCL-diol was completely dissolved, the three above-mentioned solutions were slowly added dropwise in the following order: NaHCO$_3$ saturated solution in water at a concentration of 0.5M with respect to the overall final oxidation mixture; KBr solution in water; TEMPO solution in acetonitrile. The resulting mixture was clear with an orange coloration given by the presence of TEMPO and white residuals in the solution: those were a combination of both salts, which are insoluble in acetonitrile, and PCL diol, which is insoluble in water. This solution was then sealed and stirred at R.T. for 1 h in order to ensure the maximum mutual solubility of all the components. Then, while the reaction mixture was kept on stirring at R.T., additions of NaOCl were slowly made throughout the duration of the synthesis in order to activate the oxidation of OH groups into COOH groups. For a NaOCl concentration of 5% v/v, the ratio v(NaOCl):v(acetonitrile)=1.3:1 was experimentally optimised in order to get a full oxidation of the starting PCL diol. Therefore, the total volume of NaOCl ($v_{tot}$) was divided into 4 additions: $v_1$=0.4 $v_{tot}$, $v_2$=0.4 $v_{tot}$, $v_3$=0.1 $v_{tot}$, $v_4$=0.1 $v_{tot}$ were added dropwise at time intervals of 1 hour, 4 hours, 8 hours and 24 hours, respectively, from the point of final addition of TEMPO solution. As NaOCl concentration varied among different batches, volumes $v_1$ to $v_4$ were scaled according to the ratio v(NaOCl):v(acetonitrile)=1.3:1 for a 5% v/v concentration of NaOCl.

After 4 hours from the last NaOCl addition, from a starting basic value (c.a. 8-9) the pH was adjusted by adding dropwise HCl 37% v/v until the solution reached pH≤3: this step was needed to allow the protonation of the carboxylic groups, which could be deprotonated at basic pH.

After 1 hour, acetonitrile was removed from the biphasic system by using the Rotavapor (Buchi Labortechnik AG, Switzerland) at 40° C. and 226 mbar, in order to leave the oxidised PCL-diol in a water-based solution. The polymer was subsequently extracted three times in ethylacetate, the organic layers were collected and dried over Na$_2$SO$_4$, then the solvent was evaporated to dryness under reduced pressure in order to leave the oxidised PCL-diol (PCL-diCOOH), which was finally dried under vacuum at R.T. for at least 12 hours.

Oxidation was verified with $^1$H-NMR, FTIR, and Mass Spectroscopy (for instance Maldi-Tof).

In Situ CROP+Hybrid Synthesis

In situ CROP

In a typical synthesis, PCL-diCOOH (1 mol) was dissolved in anhydrous THF at R.T. under continuous stirring. When the solution was completely clear and transparent, at time intervals of 30 minutes, GPTMS (2 mol) was added, followed by BF$_3$.OEt$_2$ (0.5 mol). A sudden temperature increase and occasionally a change in colour (from transparent to yellow) were observed, followed by a fast increase of the viscosity, indicating a rapid polymerisation of THF initiated by the activation of epoxide ring by BF$_3$.OEt$_2$, leading to the formation of a GPTMS-PTHF-PCL-diCOOH network dissolved in the non-polymerised THF. The formation of GPTMS-PTHF gel is due to THF polymerisation. Polymerisation rate of this process is a function of THF: GPTMS:PCL-diCOOH ratio and occurs at rate that spans from few minutes to 24 hours.

$^1$H-NMR was used to check the opening of the epoxide ring, the opening of the monomer ring and the appearance of a new polymer phase.

The presence of PCL-diCOOH limits the polymerisation of THF, therefore more concentrated GPTMS solutions can be used to make hybrids. In the present examples THF: GPTMS mol ratios of 16:1 to 100:1 were tested.

A GPTMS:BF$_3$.OEt$_2$ molar ratio of 1:0.25 was used. It is preferable for a minimum of 0.25 moles of BF$_3$.OEt$_2$ with respect to GPTMS moles to be added to promote opening of epoxide ring of all GPTMS molecules in the tri-component system containing PCL-diCOOH. The system still functions with lower concentrations, although only partial opening of the epoxide rings of GPTMS and partial formation of PTHF may be obtained. This can be observed with $^1$H-NMR.

When an additional silica source (TEOS) is to be included, to promote the formation of homogeneous materials it is preferable for THF to be present in excess so as to act also as the reaction solvent. The solution was usually allowed to stir for 1.5 h.

Preparation of Hydrolysis Solution

TEOS (from 0 to 95% w/w with respect to PCL-diCOOH) was placed in a beaker with deionised water and 1M HCl. Water content was calculated as the sum of the stoichiometric amounts needed to hydrolyse both TEOS and GPTMS, which means $H_2O$:TEOS=4:1 molar ratio and $H_2O$:GPTMS=3:1 molar ratio; 1M HCl was added at a concentration of 1M HCl:water=1:3% v/v. The resultant mixture was vigorously stirred for 1-1.5 h to induce complete hydrolysis.

Formation of Hybrid Sol

Hydrolysis solution was added dropwise to the GPTMS-PTHF-PCL-diCOOH solution and stirred at R.T. for 30 minutes to form the hybrid sols.

Formation of Bulk Samples

In order to obtain bulk samples, the sol was cast into PTFE containers with the desired shape (e.g. cylinders, discs), sealed and placed at 40° C. for three days: this step allowed the gelation (which occurred between 2-24 h depending on the starting amount of THF) and the following ageing in order to consolidate the hybrid network. After three days, the lids were loosened and the samples were dried at 40-60° C. over the course of 2-4 weeks, depending on the shape and the amount of starting THF: thicker samples required longer and more careful drying in order to avoid cracking due to a too fast solvent evaporation. When completely dried, samples were taken out from the oven and finally rinsed with deionised water, in order to remove reaction by-products, and used for further characterisations.

Example 6: Characterization of Bulk Hybrid Materials

Characterization of composition and microstructure was performed for bulk hybrid materials prepared according to Example 5, with different inorganic/organic ratios given by using different starting TEOS/PCL-diCOOH wt. ratios in the starting solution (0/100, 60/40, 70/30, 80/20, 90/10, 95/5). The versatility of the sol-gel synthesis allows the preparation of samples with different shapes: bulk, thin discs/membranes/films, scaffolds, etc.

The presence of organic phases (PTHF and PCL-diCOOH) and inorganic phase (silica) was identified using FTIR-ATR.

TGA/DSC analysis was used to evaluate the final inorganic/organic ratio in the bulk hybrid materials after drying. A simultaneous DSC/TGA Netzsch Jupiter STA 449C instrument, coupled with Proteus® software for the elaboration of acquired data, was used on hybrid powders (approximately 10 mg), finely ground with a pestle and mortar and weighed out into a platinum crucible. The reported values were measured from powder obtained from rectangular samples made for tensile test (width=10 mm; exposed height=25 mm; thickness≈1-2 mm). The range of analysis was 20-800° C., with a heating rate of 10° C. $\min^{-1}$ in an atmosphere of continuously flowing air. The purpose was to determine the amount of organic phase effectively incorporated in different hybrid samples (before and after soaking in PBS) from the weight loss corresponding to its burning-out.

Analysis results are shown in the table below:

| Ratio by mass of TEOS:PCL-diCOOH | wt % Inorganic calculated assuming no PTHF | Actual wt % Inorganic | % Average mass loss after 1 week PBS at 37° C. 120 rpm | Wt % Inorganic after 1 week PBS |
|---|---|---|---|---|
| 90:10 | 66 | 38.7 | 17.1 ± 0.6 | 43.0 |
| 80:20 | 49 | 24.7 | 17.6 ± 0.7 | 28.8 |
| 70:30 | 39 | 17.4 | 15.3 ± 0.4 | 19.3 |
| 60:40 | 31 | 12.3 | 12.9 ± 0.3 | 14.2 |
| 0:100 | 14 | 2.5 | 13.4 ± 0.2 | 5.0 |

The wt % inorganic equates to the silica ($SiO_2$) content of the hybrid material. Theoretical expectations that do not consider the polymerisation of THF were used to calculate the wt % inorganic that would be expected if no polymerisation of THF occurred. Comparing this to the actual wt % inorganic as measured confirms the presence of PTHF in the system. The variation of composition after soaking in PBS was also evaluated.

BFTEM/STEM-HAADF/EDX analyses (with Jeol 2100F scanning/transmission electron microscope (S/TEM) operated at 200 kV, fitted with a X-Max$^N$ Silicon Drift Detector with a detector sizes of 80 mm$^2$) was performed to determine if there is a phase separation between organic and inorganic components (for instance, if domains of silica are clearly distinguishable from domains of polymer) or if there is a true interpenetrating network. TEM images and EDX analysis showed a homogeneous sample, i.e. a true hybrid material.

XRD analysis on powders of different hybrid material compositions was performed to check if the system was amorphous, given the transparency and homogeneity of the samples. A Bruker D2 PHASER desktop X-Ray diffractometer was used, in combination with a PANalytical X'Pert HighScore software for the analysis of collected data. The measurements were performed by adopting the Bragg-Brentano camera geometry and Cu anode with Kα radiation (λ=1.54184 Å). The generator settings were fixed at 30 kV (voltage) and 10 mA (current intensity); each pattern was recorded in the range 2θ=10-80°, using a 0.035° step size with 0.35 seconds per step. Samples were analysed in powder form, manually ground with a pestle and mortar and mounted on a zero-background substrate made from an off-axis cut, high quality silicon single crystal. This analysis confirmed the materials as amorphous.

Mechanical properties and viscoelastic behaviour of hybrid materials were assessed under compression and tension. Samples with less than 20% wt $SiO_2$ were flexible. A transition of properties was observed, with flexibility decreasing with higher $SiO_2$ content. With more than 40% wt $SiO_2$, brittleness of samples was observed to increase.

Compression testing (up to failure) was performed to evaluate stress and strain at failure, with the following parameters:

cylindrical specimens: diameter≈8.5-10 mm; height≈9-13 mm

% inorganic (i.e. $SiO_2$)=20-65 wt % (from TGA)

v=1 mm/min Samples were tested in dry (as prepared) conditions and stress-deformation plots showed elastomeric behaviour, with samples having lower % inorganic ($SiO_2$) showing higher flexibility. An elastomeric material will have a non-linear stress-strain plot. An increase of stiffness is observed while the deformation increases (as seen in FIG. 1, although for the samples tested in this example fracture/failure was reached). Furthermore, the deformation was almost completely elastic, which means that the initial height of the sample is recovered if the load is released before fracture. Average stress and strain at failure were measured and observed to show a trend of decreasing strain ($\varepsilon^*$) at failure (MPa) and increasing stress ($\sigma^*$) at failure (MPa) with increasing inorganic ($SiO_2$) content. This indicates that as the inorganic content of the hybrid material increases, the material becomes stronger but less flexible.

Figure 4:
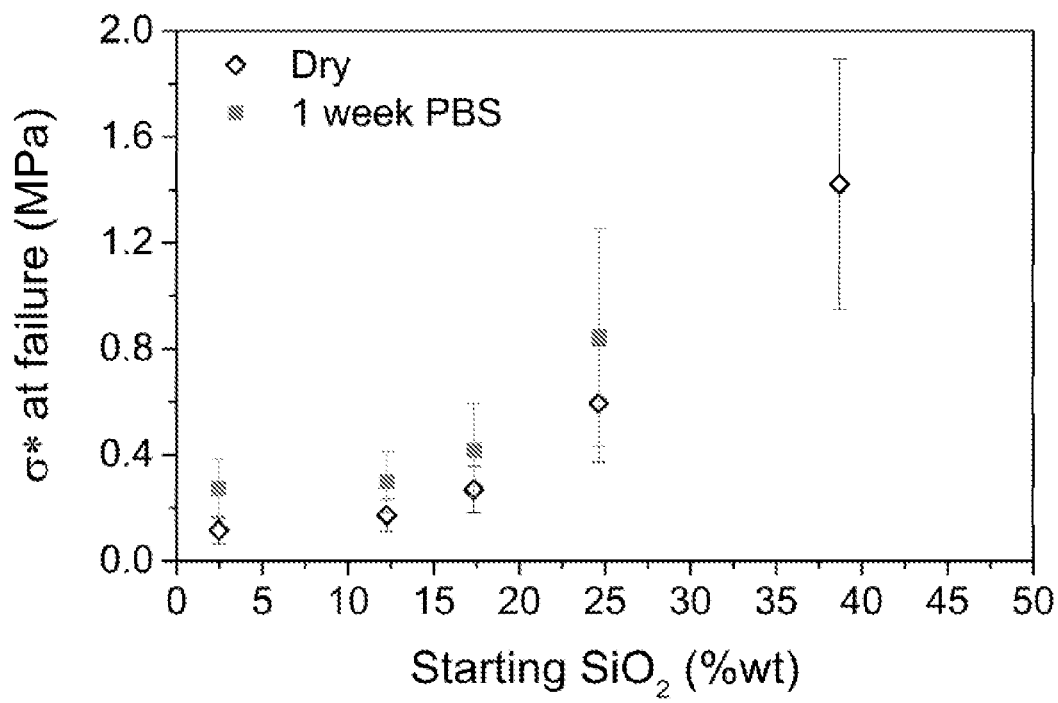
FIG. 4 shows average stress at failure for dry hybrid material and for wet samples (after soaking for 1 week in PBS), relative to starting wt % $SiO_2$ and actual wt % $SiO_2$.
Figure 4:
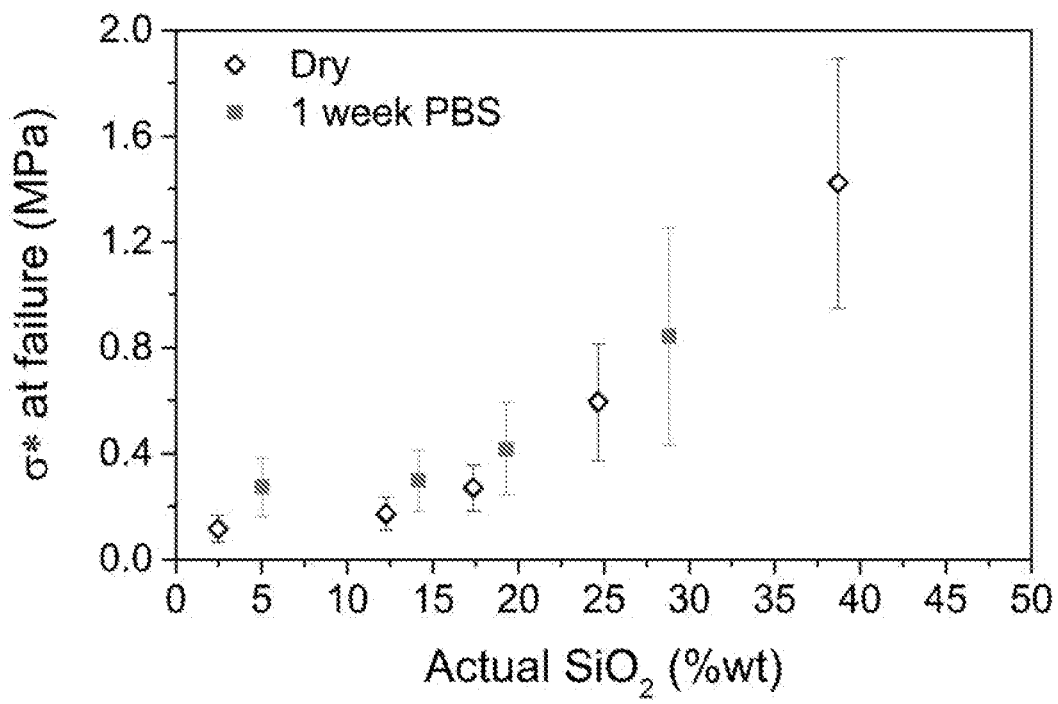
Figure 5:
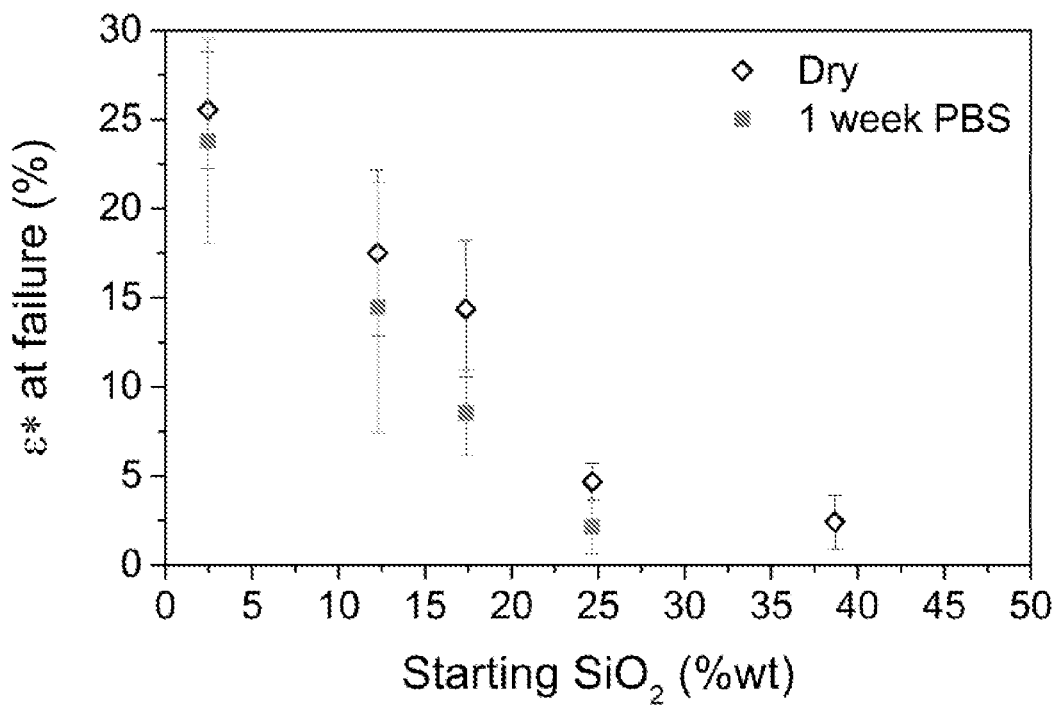
FIG. 5 shows average strain at failure for dry hybrid material and for wet samples (after soaking for 1 week in PBS), relative to starting wt % $SiO_2$ and actual wt % $SiO_2$.
Figure 5:
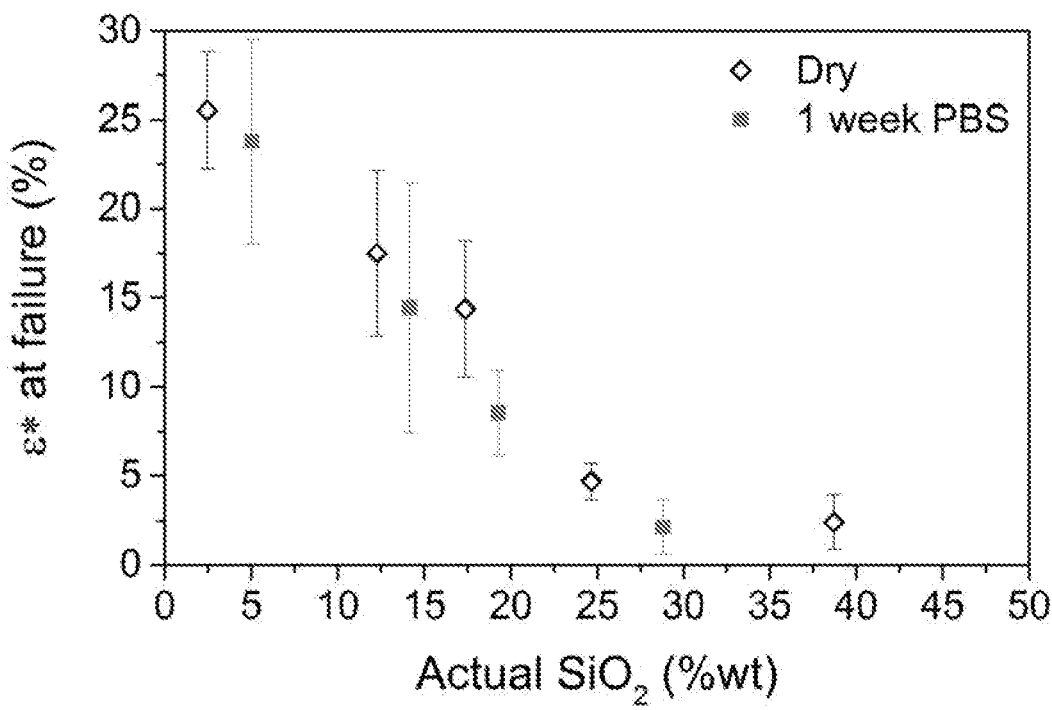

Tensile testing (up to failure) was performed to evaluate stress and strain at failure with the following parameters:
rectangular specimens: width=10 mm; exposed height=25 mm; thickness≈1-2 mm
$SiO_2$=2-40 wt % (from TGA)
v=1 mm/min Samples were tested in dry (as prepared) and wet conditions (after soaking for 1 week in PBS). Dry samples were observed to be less resistant than in compression, but still flexible. The same trend of decreasing strain ($\varepsilon^*$) at failure (MPa) and increasing stress ($\sigma^*$) at failure (MPa) with increasing inorganic ($SiO_2$) content, as observed in compression testing, was seen. Results of tensile testing before and after soaking are shown in FIG. 4. FIG. 4(a) shows true (or real) stress ($\sigma^*$) at failure at different inorganic fractions (starting wt % $SiO_2$). FIG. 4(b) shows true (or real) stress ($\sigma^*$) at failure at the actual wt % $SiO_2$, where actual wt % $SiO_2$ is determined by TGA for wet samples after soaking. After 1 week in PBS, samples partially lost polymer (PCL-diCOOH, a degradable component). This increased their stiffness (after soaking the samples showed lower max strain but higher max stress). As has been established from TGA, the hybrids changed composition on soaking (losing polymer equates to higher inorganic fraction). When considering the wet samples against their new composition, each composition (both wet and dry) followed the same trend, showing mechanical properties are maintained over degradation. FIG. 5 shows true (or real) strain ($\varepsilon^*$) at failure at different inorganic fractions and, again, mechanical properties were maintained over degradation. The plots reported in FIGS. 4 and 5 are related to true/real values, but the trend of increasing stress and decreasing strain with increasing $SiO_2$ content is the same for both conventional and true values DMA in compression and in tension (on the same types of sample described above for compressive and tensile tests up to failure) was carried out to evaluate the storage modulus (indicative of elastic behaviour) and loss modulus & tan($\delta$) (indicative of plastic/dissipative behaviour). The test, performed using a Bose ElectroForce® 3200 Series III equipped with WinTest® 7 and WinTest® DMA softwares, spanned a range of frequency between 0.01-10 Hz. The test showed an exponential increase of storage modulus, which is indicative of the stiffness of the material, with increasing inorganic content. The order of magnitude exhibited by the storage modulus spanned between $10^{-1}$ to $10^2$ MPa, revealing the high versatility of the hybrid material by simply changing the inorganic/organic ratio. Furthermore, negligible values of loss modulus and tan($\delta$) were measured, demonstrating the elastic nature of the hybrids and the absence of plastic deformation. Samples were tested in dry and wet conditions (after soaking for 1 week in PBS), confirming the results observed on static tests up to fracture.

In conclusion from mechanical testing, generally elastomeric behaviour (with the ability of recovering the deformation if the load is released before fracture) was observed. In the range of compositions tested, mechanical properties span from the behaviour of a rubber to the behaviour of a glass with improved toughness, indicating a very versatile material, where properties can be tuned by changing the inorganic/organic ratio.

The ability of the hybrid materials to support cell attachment was assessed. Tests were performed using discs of 21 wt % and 34 wt % $SiO_2$ hybrid samples, which were sterilized by soaking in 70% ethanol for 24 hrs. 1×104 MC3T3 cells (preosteoblast cell lines) were seeded onto the hybrid discs and cultured for 3 days (in basal α-MEM). Viable cell spreading was evidenced by well-defined expression of two of the main cytoskeletal constituents, Vimentin (intermediate filament proteins) and F-actin (microfilament).

Biodegradation was assessed in in vitro dissolution studies. Cylindrical samples soaked in PBS for a number of months remained in one piece: partial loss of polymer occurred at the beginning of soaking, after which materials were stable. PCL is biodegradable, so the hybrids containing it are partially bioresorbable.

Example 7: Assessment of Self-Healing

Figure 6:
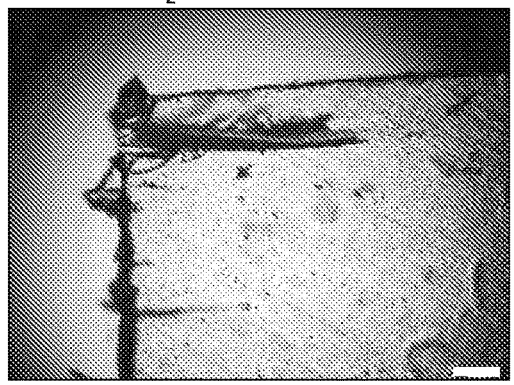
FIG. 6 shows optical microscope images of hybrid material samples before creation of a defect and after self-healing (scale bar=500 μm for all pictures).
Figure 6:
Figure 6:
Figure 6:
Figure 6:
Figure 6:
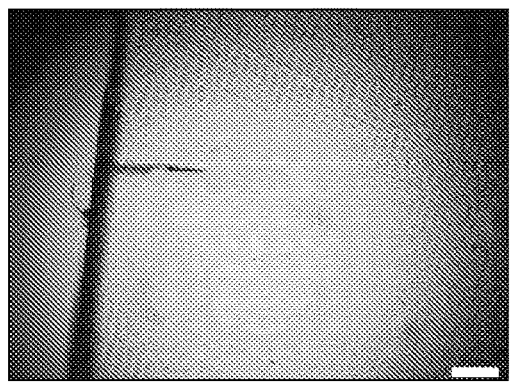
Figure 6:
Figure 6:
Figure 6:
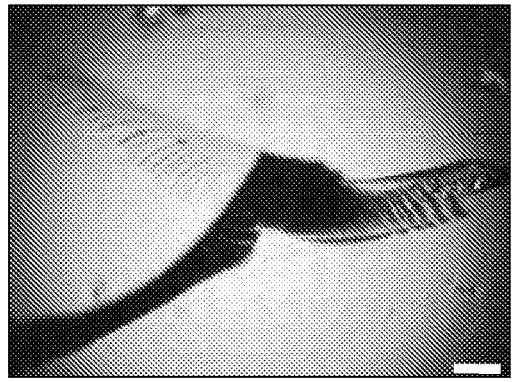

Qualitative evaluation was carried out with optical microscope on the same series of $SiO_2$/PTHF/PCL-diCOOH hybrid materials samples used for the tensile test in Example 6 ($SiO_2$=2-40 wt %). Images were taken immediately after creating a defect and after healing of the defect. For materials with lower inorganic content (2.5 wt % $SiO_2$, 12.3 wt % $SiO_2$ and 17.4 wt % $SiO_2$), defects were created using a needle inserted into the side of the samples. These healed within 5 seconds, with healing occurring faster, the greater the organic content. Hybrid compositions with higher inorganic fractions (24.7 wt % $SiO_2$ and 38.7 wt % $SiO_2$) had defects created by making a small notch on the surface of the samples, and then compressing the sample until a partial internal crack appeared. Both compositions took 24 hours to self-heal, with the 24.7 wt % $SiO_2$ composition healing to a greater extent than the 38.7 wt % $SiO_2$ composition. Optical micrographs are shown in FIG. 6. FIG. 6(a) shows a sample with a $SiO_2$ content of 12.3 wt % with images taken immediately after creation of a defect and 5 seconds after creation of a defect. FIG. 6(b) shows a sample with a $SiO_2$ content of 24.7 wt %, with images taken immediately after creation of a defect and 24 hours after creation of a defect. FIG. 6(c) shows a sample with a $SiO_2$ content of 38.7 wt %, with images taken immediately after creation of a defect and 24 hours after creation of a defect. The self-healing ability was faster at lower silica contents, but was observed in this test for all tested compositions, which had up to 40 wt % $SiO_2$. The self-healing ability was autonomous, with no external stimuli required.

Figure 7:
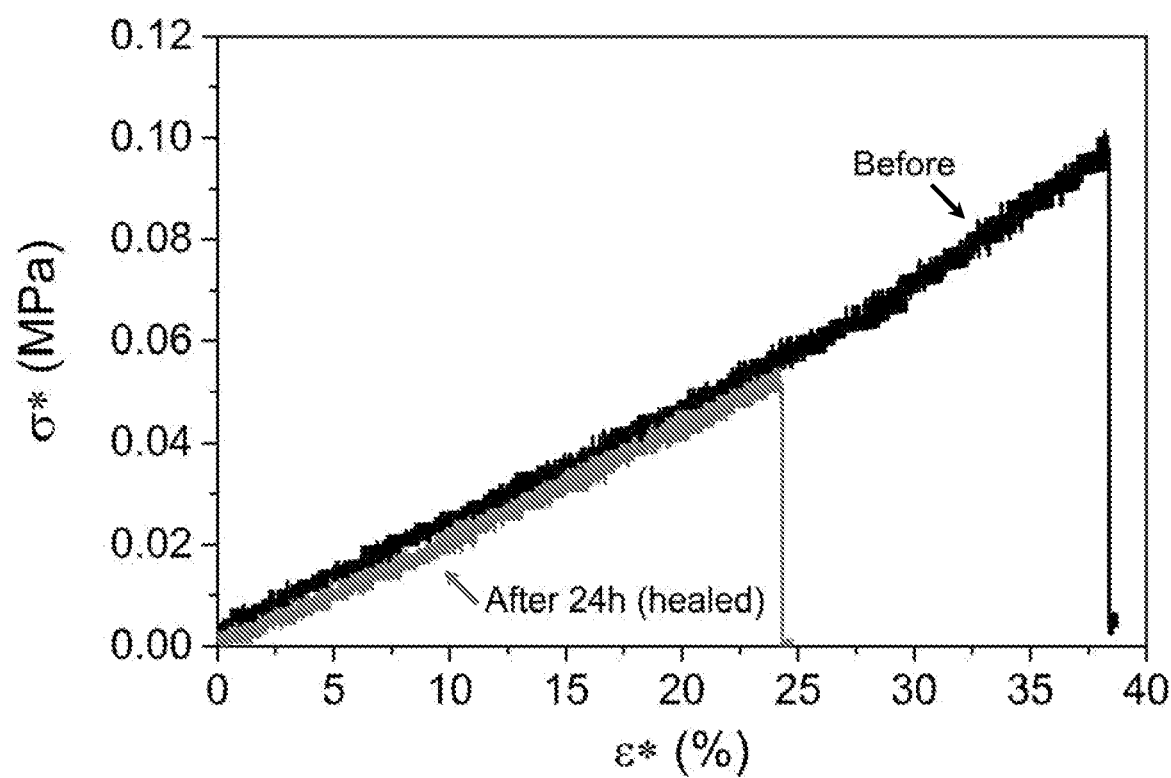
FIG. 7 shows stress-strain results for hybrid samples before defect creation and after self-healing.

Tensile testing was used to quantitatively evaluate the self-healing ability on dry samples with TEOS/PCL=0/100% w/w (2.5 wt % $SiO_2$ from TGA). Tests were carried out on rectangular specimens: w=10 mm; exposed h=25 mm; t=1-2 mm, at v=1 mm/min. Samples were tested in tension up to fracture, the fractured pieces were brought back together immediately after the test, left healing at room temperature for 24 h and then re-tested in tension up to fracture. Stress-strain results are shown in FIG. 7. For this figure and example, true (real) values were plotted. After being fractured under tension into two portions and subsequently being allowed to self-heal, the material recovered 36.03±16.19% of its original strain ($\varepsilon^*$) at failure and 30.69±14.69% of its original stress ($\sigma^*$) at failure. These values were calculated as follows:

% recovered ε*=100%×(ε*after 24 h healing)/(ε*before)

% recovered σ*=100%×(σ*after 24 h healing)/(σ*before)

Accordingly, these values represent healing efficiency:

$$\eta = \frac{f_{Healed}}{f_{Pristine}} \cdot 100\%$$

where f is ε* or σ*.

Example 8: 3D-Printing of the Hybrid Sol-Gel

To 3D-print porous scaffolds, a sol prepared as described in Example 5 was moved into a temperature-controlled bath at 60° C. and stirred without the lid in order to evaporate part of the residual THF and accelerate the gelation process, until a suitable viscosity for 3D-printing was reached. Subsequently the sol was placed in ultrasound bath to remove the bubbles given by the THF evaporation under continuous stirring. Then, the sol was manually transferred into a 3 ml luer-lock plastic syringe (VWR International, UK), equipped with a proper tip for 3D-printing (Nordson EFD, UK), and residual air was removed by tilting the syringe with the nozzle upwards and manually pressing the plunger until the sol started to be extruded. The syringe was then placed into a 3D-printer ("Robocaster", 3d Inks LLC, USA), connected to a computer equipped with the software "Robocad" (3d Inks LLC, USA), which controlled the printing of porous scaffolds following a CAD file previously designed. The sol, when transferred into the syringe, was still too liquid for printing but it had the right viscosity to allow the removal of bubbles and the transfer. While the sol was kept in the syringe during the following steps (positioning in the robocaster, designing the CAD file, etc. . . . ), the gelation process continued and determined the transition from sol to gel, which had a suitable viscosity to be used as an ink for 3D-printing: this means a gel that can flow through the nozzle without clogging it but, at the same time, can keep the shape when extruded, avoiding the collapse of the stacked layers. Once the right viscosity of the gel was achieved, the window of printability was around 1 h, during which porous 3D scaffolds with the desired shape were printed. The obtained scaffolds, still consisting of a wet gel due to the presence of residual THF, were then placed into THF resistant containers (for example Nalgene polymethylpentene (PMP) or PTFE containers), sealed and aged at 40° C. for 1-3 days: this step allowed the completion of the gelation in order to fully consolidate the hybrid network. Subsequently, the lids were loosened and the samples were dried at 40-60° C. over the course of 4-7 days in order to completely evaporate the entrapped solvent. Scaffolds were finally rinsed with deionised water to remove reaction by-products and the samples were ready for use.

With modulation of times to achieve appropriate viscosities, a corresponding procedure can be used to print a sol prepared as described in Example 2.

It is also possible for the material to be stored as an ink in the syringe by storing at very low temperatures. Material in a syringe stored at −82° C. was found to successfully print after 2-3 weeks storage. Water (residual from TEOS hydrolysis) freezes at this temperature, whereas ethanol (residual from TEOS hydrolysis) and THF (residual from organic solution) do not, since their freezing points are −114 and −108° C., respectively. The gelation reaction is slowed down so much that the ink can be stored without significant changes. The ink can be then defrosted at room temperature. For example, a 3 mL syringe was found to require 10-15 minutes to defrost and could then be used for printing as for a freshly prepared ink. This has benefit for upscaling ink production, since a large batch of ink can be prepared and stored in single syringes rather than requiring ink to be prepared fresh every time it is used. Storage at even lower temperatures, below the THF freezing point, is expected to halt polymerisation and extend the potential storage time.

Example 9: Characterization of Hybrid 3D-Printed Scaffolds

Scaffolds were prepared according to Example 8, using THF; $BF_3.OEt_2$; GPTMS; PCL-diCOOH and TEOS, with different inorganic/organic ratio given by different starting TEOS/PCL-diCOOH ratios. Two compositions were tested, with TEOS/PCL-diCOOH ratios of 70/30 and 80/20% w/w.

The combination of the sol-gel process (inorganic component) and the polymerisation of THF (organic component) leads to the formation of a sol-gel that can be directly extruded without any further additive.

Figure 8:
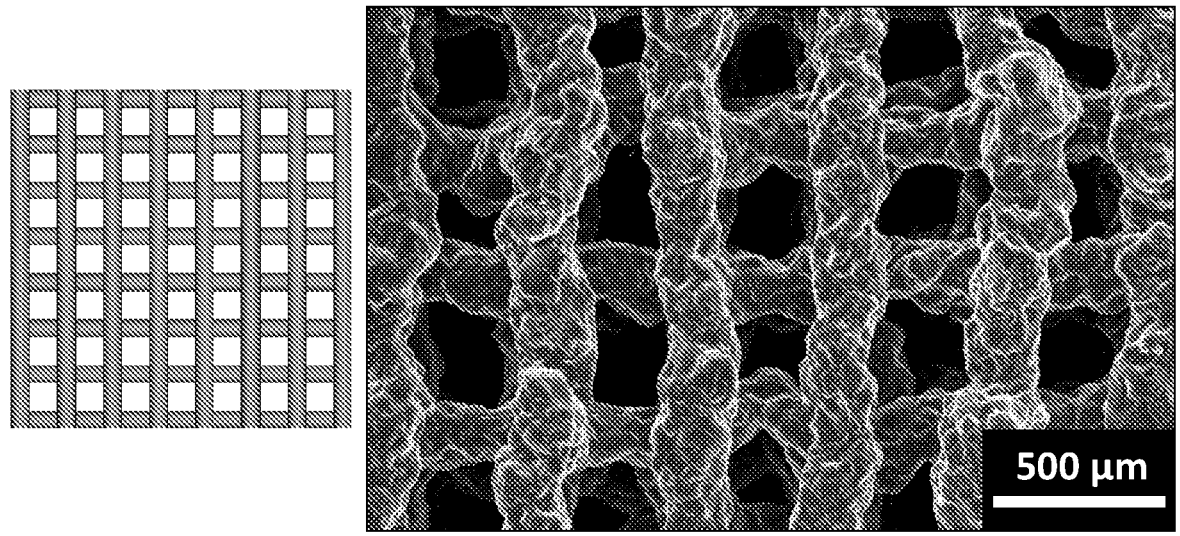
FIG. 8 shows print patterns and SEM images of top surfaces of 3D printed hybrid material (a) with an aligned print pattern and (b) with a shifted print pattern.
Figure 8:
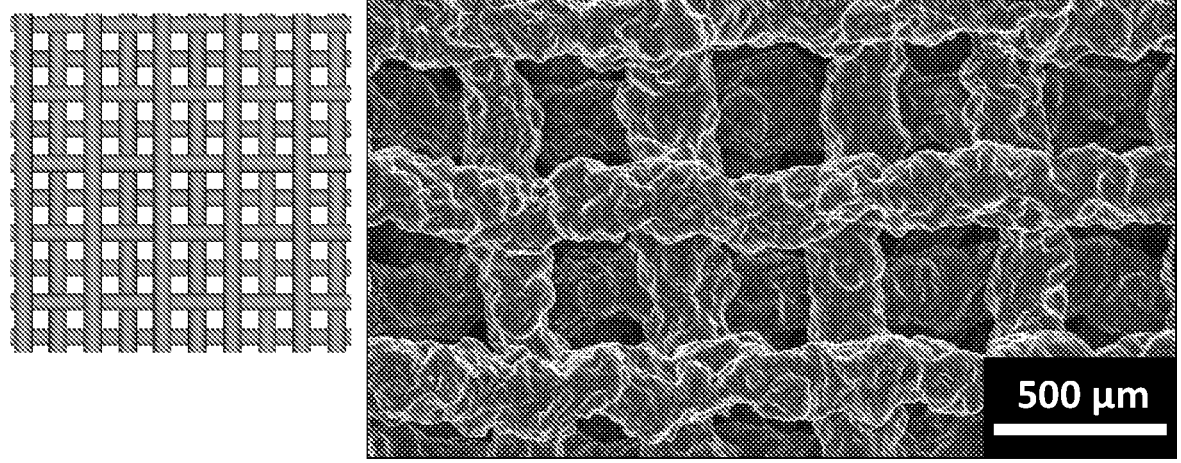
Figure 9D:
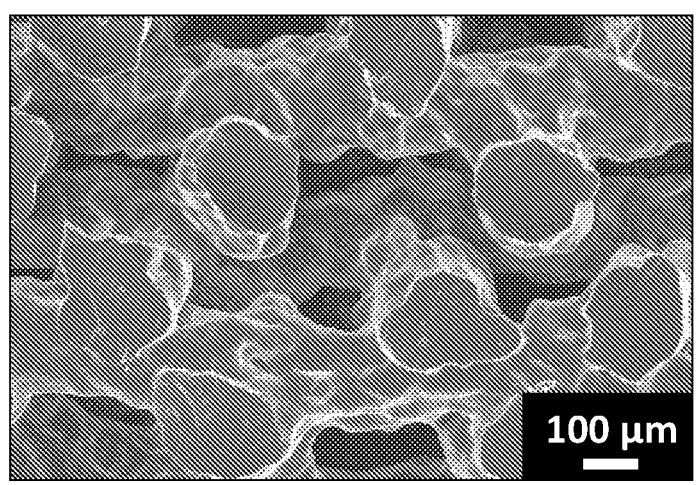
FIG. 9 shows SEM images of cross-sections of 3D printed hybrid material (a) horizontal cross-section of aligned print pattern; (b) vertical cross-section of aligned print pattern; (c) horizontal cross-section of shifted print pattern; and (d) vertical cross-section of shifted print pattern.

The pore size and strut diameter after printing and shrinkage were assessed in relation to the expectations of the two designs tried (an "aligned" pattern and a "shifted" pattern). SEM images were taken of the top surface and for horizontal and vertical cross-sections. These images are shown in FIGS. 8 and 9. FIG. 8 shows print patterns and SEM images of 3D printed hybrid material (a) with an aligned print pattern and (b) with a shifted print pattern. FIG. 9 shows SEM images of cross-sections 3D printed hybrid material (a) horizontal cross-section of aligned print pattern; (b) vertical cross-section of aligned print pattern; (c) horizontal cross-section of shifted print pattern; and (d) vertical cross-section of shifted print pattern. From the images, it is possible to assess the dimensions of struts and pores (strut diameter is ~200 µm, pores visible on the top surface and horizontal section show a width of ~200 µm in the aligned pattern, ~300 µm in the shifted pattern). The % of porosity was also calculated, as follows:

TEOS/PCL=80/20% w/w aligned→42.4±3.6%

TEOS/PCL=80/20% w/w shifted→51.7±1.8%

TEOS/PCL=70/30% w/w aligned→40.2±2.9%.

Composition was assessed. FTIR was used to check the presence of organic and inorganic phases and, in combination with TGA/DSC, to compare results with those obtained for bulk samples with same initial TEOS/PCL-diCOOH ratio. TGA/DSC was used to evaluate the actual final inorganic/organic ratio after drying was completed. It was observed that, depending on the geometry of the samples and the environmental conditions, the inorganic/organic ratios may be varied in final hybrid samples. For example, compared to the values obtained for bulk cylindrical samples of the same composition, scaffolds showed a lower organic content. This suggests a lower PTHF formation due to a faster drying that is inherent to the 3D-printing process. THF starts to polymerise when $BF_3.OEt_2$ is added to the polymer solution, but the polymerisation keeps on going during ageing step; when scaffolds are 3D-printed, most of the THF is evaporated before and during printing, therefore there is less available to polymerise and the residual evaporates faster because of the higher exposed surface compared to bulk samples. The same difference is also observed moving from bulk cylinders to thin discs, which show a lower organic content.

For example, when a starting TEOS/PCL-diCOOH ratio of 80/20% w/w is used, the final $SiO_2$ wt % was 20% in a bulk cylinder; 25% in a thin disc and 30% in a 3D-printed scaffold.

Mechanical properties of 3D-printed scaffolds were assessed using compression testing (up to failure) to evaluate stress and strain at failure, with the following parameters:
 cubical scaffolds: (5×5×5)mm$^3$ dimensions
 v=0.5 mm/min A reference series of hybrid scaffolds containing 30 wt. % $SiO_2$ with "aligned" design was assessed before and after soaking for 1 week in PBS. Then, the variations determined by reducing the silica content to 20 wt. % (keeping the design unchanged) and by changing the design to "shifted" (considering 30 wt. % $SiO_2$ content) were evaluated.

Overall, the elastomeric behaviour observed on bulk samples was maintained also in 3D porous structures: all tested scaffolds showed remarkable flexibility, with the capability of recovering the initial height when the load is released before fracture. Here again, true (real) values of stress and strain are reported. Reference samples (30 wt. % $SiO_2$—aligned) showed $\sigma^*$ at failure equal to 1.2±0.2 MPa, corresponding to $\varepsilon^*$ of 36.0±7.0%: either the decrease of inorganic content or the shifting of the struts resulted in an improvement of the flexibility, showing an increase of the $\varepsilon^*$ and a reduction of $\sigma^*$ at failure. Consistently with the outcomes of mechanical testing on bulk samples, the soaking in PBS determined a partial loss of PCL-diCOOH but the mechanical properties were maintained over degradation, since an increase of stiffness without decreasing of strength was observed.

A study of the behaviour of scaffolds in compression under cyclic loading conditions was also performed in order to give an indication of the ability to recover the deformation of $SiO_2$/PTHF/PCL-diCOOH tri-component materials when processed into a porous shape. This test was run on a sample from each of TEOS/PCL=80/20 wt. % aligned, TEOS/PCL=80/20 wt. % shifted, and TEOS/PCL=70/30 wt. % aligned.

Figure 10:
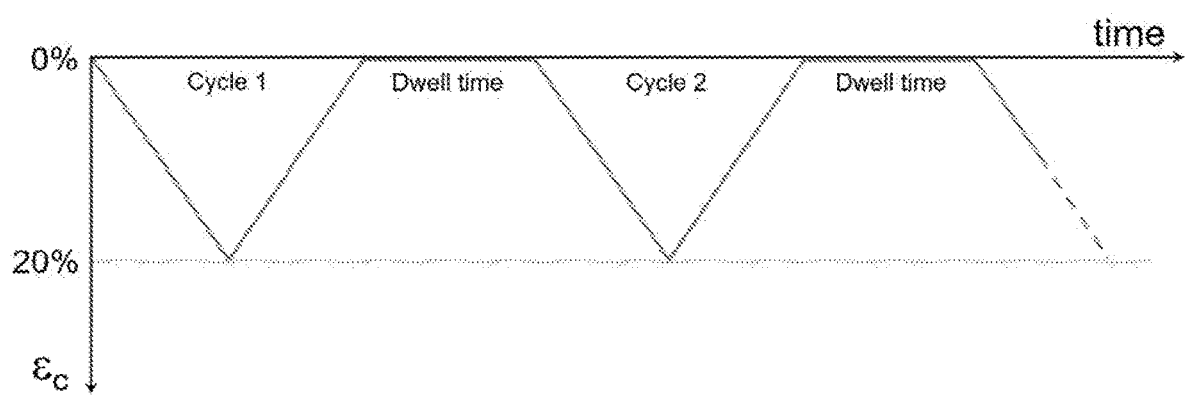
FIG. 10 shows a schematic of the cyclic loading regime followed for cyclic compression testing.

Cubic scaffolds of (5×5×5) mm$^3$ were subject to 10 cycles, all in equal conditions. The experiment was strain-controlled in order to compress each sample up to 20% of its initial height (i.e. conventional strain), which correspond to ~50-60% of the $\varepsilon_c$ at failure; both the loading and unloading steps were performed at an equal speed of 0.5 mm/min. Between each cycle a dwell time of 30 s was programmed to let the sample recover the deformation after each loading cycle. A schematic of the cyclic loading regime followed for this experiment is shown in FIG. 10 and results are shown in FIG. 11, in which a) TEOS/PCL=80/20 wt. % aligned, b) TEOS/PCL=80/20 wt. % shifted, and c) TEOS/PCL=70/30 wt. % aligned.

Figure 11:
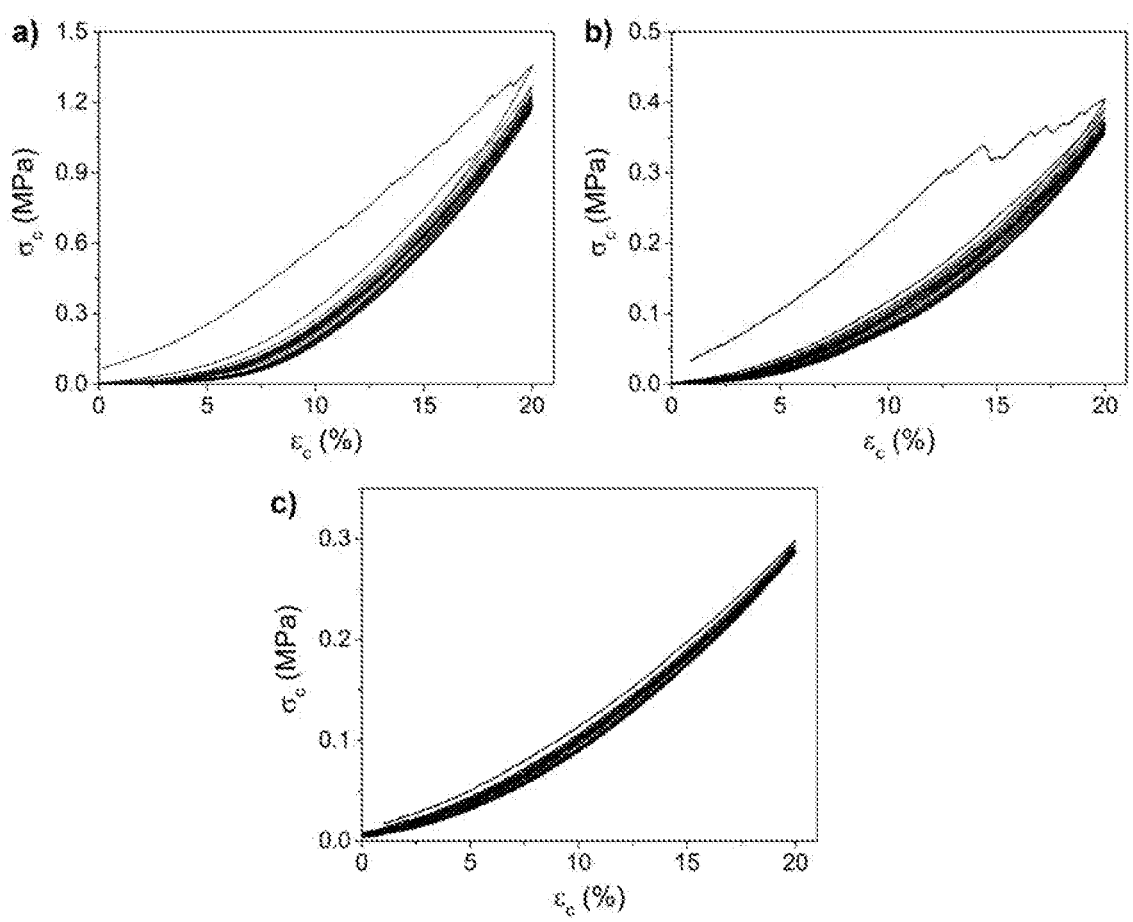
FIG. 11 shows results of cyclic compression testing for 3D-printed scaffold samples: a) TEOS/PCL=80/20 wt. % aligned, b) TEOS/PCL=80/20 wt. % shifted, c) TEOS/PCL=70/30 wt. % aligned.

From the plots shown in FIG. 11 it is evident that the three scaffolds showed a first cycle with a different stress-strain behaviour, followed by nine cycles which almost overlapped.

The difference in the first cycle was more evident in 80/20 wt % samples, whilst it was less significant for 70/30 wt %. Except the first cycles, a small hysteresis between loading and unloading was observed in all the others; the chosen dwell time (30 s), however, was enough for the sample to fully recover the deformation, which is why the loading and unloading sectional always substantially overlapped among different cycles. It was also noted that all the scaffolds recovered their original shape after the experiment ended.

These results indicate that the scaffolds are able to recover their shape at the chosen level of strain, confirming a negligible energy loss between the different cycles. To this end it is believed that an essential role is played by the covalent chemical bonding within the sol-gel, which guarantees a continuum among stacked layers. This continuum (fusion between struts and absence of discrete interfaces) can be confirmed by SEM, where interfaces between struts were not observable The absence of an interface among struts allowed the scaffold to behave as a unique phase maintaining the hybrid bulk features.

Without wishing to be bound by theory, it is hypothesized that the anomalous first cycle derives from the combination of two effects. Firstly, rupture of single labile struts may occur under compression due to a not perfectly regular structure of the scaffold, creating small defects not detectable to the naked eye. These were proven not to affect the mechanical behaviour significantly. A second factor is ascribable to a characteristic featured by pure elastomers, with which $SiO_2$/PTHF/PCL-diCOOH hybrid material shares its mechanical behaviour, namely the Mullins Effect, which is mechanical stress softening due to the transformation of hard domains to soft domains, which determines a decrease in stress on unloading compared to loading, giving rise to hysteresis. Studies have proven that this phenomenon occurs mostly in large strain cyclic loading tests in the first few cycles, particularly the first, and it is almost negligible in the subsequent cycles. The presence of the hysteresis in all the other nine cycles is an indication of a viscoelastic behaviour, because it means that the material has a phase lag (delay) in recovering the deformation. This is still very small for these scaffolds and can anyway be considered beneficial, for example for scaffold applications, as it is similar to that exhibited to a greater extent by cartilage.

In conclusion, compression tests showed that the versatility of the hybrid materials due to the control over the inorganic/organic ratio can be combined with the tailorability of the design of the 3D-printed porous scaffolds. The contemporary tuning of the hybrid composition, alignment of the struts, pore percentage and dimension allows matching of the required properties for the final application.

Cell attachment and chondrocyte differentiation (21 day time point) testing also showed very promising results in terms of biological behaviour of the hybrid 3D-printed scaffolds. Analyses for cell attachment and chondrocyte differentiation were carried out with ATDC5 (murine chondrogenic cell line) on reference 3D-printed scaffolds (30 wt. % $SiO_2$—aligned, 5×5×5 mm$^3$). Samples were sterilised by soaking for <5 mins in 70% ethanol prior to cell seeding. Cytoskeletal constituents, Tubulin (microtubules) and F-actin (microfilaments) were immunolocolised in ATDC5 cells following 72 hours of culture, evidence of functional cell attachment on the scaffolds. Immunohistochemical analysis of day-21 cell-seeded constructs demonstrated a robust expression of Sox9, a marker for chondrogenic differentiation, Aggregan, a marker for cartilage matrix component, and Collagen Type II, which is a hyaline cartilage specific marker. The negligible expression of Collagen Type I, a marker of fibrous cartilage or bone phenotype, as well as the lack of expression of Collagen type X, a marker of chondrocyte hypertrophy (one of the event in calcification), showed that the construct has stable articular cartilage phenotype.

Example 10: Joining of Monolith and Scaffold to Obtain an Osteochondral Device The versatility of the hybrid material synthesis described herein allows the synthesis of bulk samples and the 3D printing of porous scaffolds to be combined in order to achieve not only a physical stacking of the two forms of material, but a true chemical bonding after which no interface between the joined components is visible by SEM. This approach can be used to prepare an osteochondral device, for the treatment of osteochondral defects consisting of a scaffold capped by a dense monolith layer.

The tri-component $SiO_2$/PTHF/PCL-diCOOH system made from a TEOS/PCL ratio of 80/20 wt % (using a PCL of Mw=530 Da), in order to provide biodegradability, was utilized in the following synthesis process:

1) Preparing the sol to make the bulk sample as reported in previous examples (i.e. Example 5), casting and allowing gelation.

2a) Printing a scaffold and placing it on the wet gel prepared in step 1), then ageing and drying as described in the previous examples (i.e. Example 8).

2b) Alternative to 2a), printing the scaffold directly on the wet bulk gel, then ageing and drying as described in the previous examples (i.e. Example 8).

Approaches 2a) than 2b) both achieved excellent bonding between the scaffold struts and the dense monolith.

Figure 12:
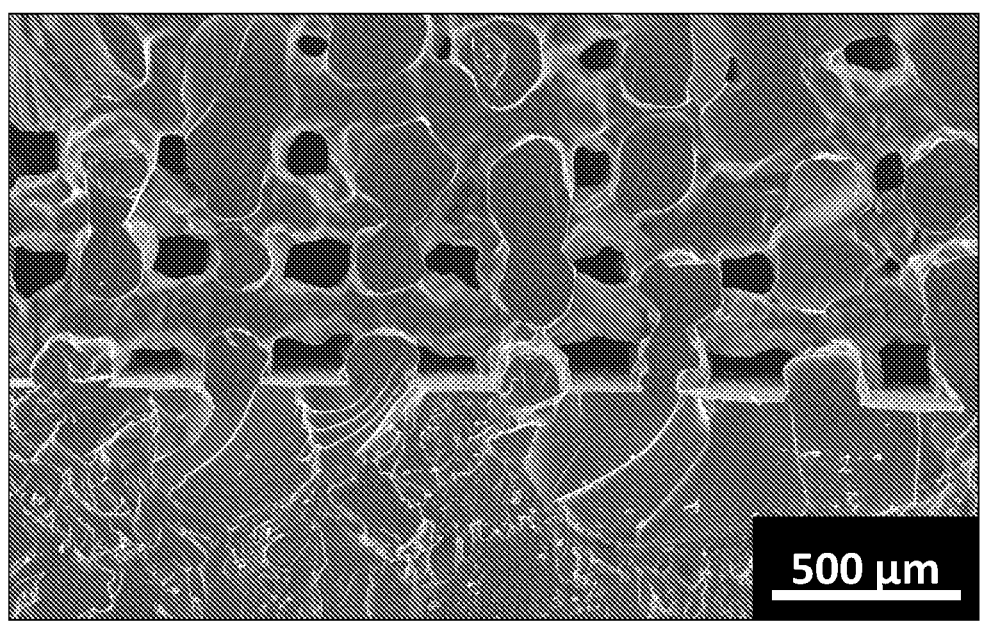
FIG. 12 shows an SEM image of device prepared using hybrid material and comprising a joined monolith and porous scaffold.

The chemical bonding between scaffold and bulk was confirmed by SEM analysis, where the fusion, without evident interface, between the dense monolith and the struts of the first layer of the scaffold is evident (see FIG. 12).

Example 11: Synthesis of Hybrids Containing Ca and P in the Inorganic Part

Samples containing Ca and P were prepared in a modification of the route used to make Tri-component $SiO_2$/PTHF/PCL-diCOOH hybrid materials as described at Example 4, including calcium methoxyethoxide (CME) as a Ca source and, optionally triethylphosphate (TEP), as a P source.

Preparation of the Inorganic Solution:

CME was prepared following the method described by Yu et al. Effect of Calcium Source on Structure and Properties of Sol-Gel Derived Bioactive Glasses, Langmuir 2012, 28, 17465-17476.

TEOS, CME and TEP were then mixed at room temperature under continuous stirring for at least 3 hrs. The following molar ratios were experimentally prepared:

1) TEOS/CME=$SiO_2$/CaO=60/40 molar ratio
2) TEOS/CME/TEP=60/36/8 molar ratio in order to obtain $SiO_2$/CaO/$P_2O_5$=60/36/4 molar ratio
3) TEOS/CME/TEP=60/32/16 molar ratio in order to obtain $SiO_2$/CaO/$P_2O_5$=60/32/8 molar ratio
4) TEOS/CME/TEP=60/28/24 molar ratio in order to obtain $SiO_2$/CaO/$P_2O_5$=60/28/12 molar ratio (Note—1 mol TEOS gives 1 mol $SiO_2$; 1 mol CME gives 1 mol CaO; 2 moles TEP give 1 mol $P_2O_5$ because TEP has only 1 P)

In Situ CROP+Hybrid Synthesis

After at least 1 h from starting of mixing TEOS, CME and optionally TEP, the organic source solution (containing PCL-diCOOH, THF, GPTMS, $BF_3.OEt_2$) was prepared as described in Example 4 (30 minutes preparation, followed by 1.5 hrs mixing under continuous stirring at R.T.). In all examples the amount of different reagents was calculated in order to have TEOS/PCL-diCOOH=80/20% w/w Formation of Hybrid Sol The two solutions (inorganic and organic) were then mixed together and stirred at R.T. for 1 h to form the hybrid sol.

Deionised water and 2M nitric acid (2M $HNO_3$) were added to the solution, which was then allowed to stir for 20-30 minutes in a sealed container at R.T. Water content was calculated as the sum of the stoichiometric amounts needed to hydrolyse both TEOS and GPTMS, which means $H_2O$:TEOS=4:1 molar ratio and $H_2O$:GPTMS=3:1 molar ratio; 2M $HNO_3$ was added at a concentration of 2M $HNO_3$:water=1:6% v/v. This step can also be carried out with varying water contents, for example a lower water content, to control of the speed of gelation.

Formation of Bulk Samples

In order to obtain bulk samples, the sol was cast into PTFE containers with the desired shape (e.g. cylinders, discs), sealed and placed at 40° C. for three days: this step allowed the gelation (which occurred between 1-24 h depending on the starting amount of THF) and the following ageing in order to consolidate the hybrid network. After three days, the lids were loosened and the samples were dried at 40-60° C. over the course of 2-4 weeks, depending on the shape and the amount of starting THF: thicker samples required longer and more careful drying in order to avoid cracking due to a too fast solvent evaporation. When completely dried, samples were taken out from the oven and finally rinsed with deionised water, in order to remove reaction by-products, and used for further characterisations. As for previous examples, TGA confirmed the inorganic/organic ratio (demonstrating again that the amount of organic component was higher than expected, consistent with the formation of PTHF); FTIR demonstrated PTHF presence; compression testing showed a tough material (less flexible than the samples without Ca and P, but stronger); degradation testing showed a faster and more congruent degradation than material with just $SiO_2$ because, by the addition of Ca (and P), the inorganic part is made bioresorbable; bioactivity testing showed that the presence of Ca (and P) made the material bioactive with apatite-like deposition after only 3 days in SBF, confirmed by XRD analysis; 3-day cell attachment testing using and osteoblast cell line gave promising results.

Example 12: Alternatives for Cationic Ring-Opening Polymerisation Tried and Checked with $^1$H-NMR Following procedures analogous to those described in Example 4, the following variations to the THF+GPTMS+$BF_3OEt_2$(+TEOS) (+PCL-diCOOH) system were also observed to undergo CROP, as confirmed with $^1$H-NMR:

Cyclic monomer (alternatives to THF):
  1,4 dioxane
  ε-caprolactone
  Tetrahydropyran
  3,6-Dimethyl-1,4-dioxane-2,5-dione (known also as lactide), chloroform used as solvent since it is a monomer in solid state
  THF and ε-caprolactone (co-polymerisation of the 2 monomers)

Catalyst (alternatives to $BF_3OEt_2$):
  Scandium(III) Triflate (Sc(OTf)$_3$)
  Ytterbium(III) Triflate (Yt(OTf)$_3$)
  Trimethylsilyl trifluoromethanesulphonate (TMSOTf)

Epoxide (alternatives to GPTMS):
   Glycidyl methyl ether
   Bisphenol A diglycidyl ether
   1,4-Butanediol diglycidyl ether
D-COOH (alternatives to PCL-diCOOH):
   Propionic acid (CAS 79-09-4)→carboxylic acid with 3 C (propanoic acid)
   Hexanedioic acid (CAS 124-04-9)→dicarboxylic acid with 6 C (adipic acid)
   Hexadecanedioic acid (CAS 505-54-4)→dicarboxylic acid with 16 C (tapsic acid)
   Isophthalic acid (CAS 121-91-5)→Benzene-1,3-dicarboxylic acid
   Phthalic acid (CAS 88-99-3)→1,2-Benzenedicarboxylic acid (isomer of isophthalic acid)
   Poly(ethylene glycol) bis(carboxymethyl) ether (CAS 39927-08-7)
S (alternatives to TEOS):
   (3-Mercaptopropyl)trimethoxysilane (CAS 4420-74-0)

The invention claimed is:

1. A process for producing an inorganic/organic hybrid material comprising a polymeric component formed by ring opening polymerisation of cyclic monomer containing at least one ring heteroatom, the process comprising:
   (i) forming a reaction mixture comprising cyclic monomer, optionally in the presence of solvent, and an epoxide compound comprising an epoxide ring and an inorganic component wherein the epoxide compound is an organosilicon epoxide;
   (ii) adding catalyst to the reaction mixture to activate the epoxide compound and initiate cationic ring-opening polymerisation of the cyclic monomer; and
   (iii) hydrolysis and condensation of the reaction mixture formed in step (ii) to produce an inorganic/organic hybrid material, wherein the material comprises covalent bonds between at least one component of the epoxide compound and the polymeric component;
   wherein the cyclic monomer is tetrahydrofuran (THF), tetrahydropyran, tetrahydrothiophene, ε-caprolactone, β-propiolactone, γ-butyrolactone, p-dioxanone, N-methyl-2-pyrrolidone, 2-pyrrolidone (2-Pyrr), 3,6-Dimethyl-1,4-dioxane-2,5-dione, γ-thiobutyrolactone, ε-caprolactame, 2-methyl-2-oxazoline, 3-benzyl-1,3-oxazolidine-2-thione (BOT), 3-benzyl tetrahydro-1,3-oxazolidine-2-thione (BTOT), a cyclic siloxane, or a mixture thereof.

2. The process of claim 1, wherein hydrolysis and condensation is achieved by addition of an acid and water to the reaction mixture formed in step (ii).

3. The process of claim 1, wherein the process further comprises addition of an additional silica source to the reaction mixture.

4. The process of claim 3, wherein the additional silica source is an alkylalkoxy silane, a tetraalkoxysilane, or a mixture thereof.

5. The process of claim 4, comprising hydrolysis of the additional silica source prior to addition to the reaction mixture.

6. The process of claim 3, wherein the monomer is tetrahydrofuran (THF), the epoxide is (3-glycidyloxypropyl)trimethoxysilane (GPTMS), no carboxylic acid is added to the reaction mixture and an additional silica source is added to the reaction mixture.

7. The process of claim 6, wherein the process comprises the additional step of hydrolysis and condensation of the reaction mixture formed in step (ii) to produce an inorganic/organic hybrid material, wherein the hybrid material has an inorganic content of 2 to 70 wt %.

8. The process of claim 1, wherein the epoxide is an (epoxyalkyl)alkoxysilane.

9. The process of claim 8, wherein the (epoxyalkyl)alkoxysilane is (3-glycidyloxy-propyl)trimethoxysilane (GPTMS); (3-glycidyloxypropyl)triethoxysilane (GPTES); 3-(glycidoxy-propyl)ethyldiethoxysilane (GPMDES); 2-(3,4-epoxycyclohexyl)ethyltrimethoxysilane (TRIMO); (3-glycidoxypropyl)-dimethylethoxysilane (GPMES); beta-(3,4-epoxycyclohexyl)ethyltriethoxysilane (EEES); beta-(3,4-epoxycyclohexyl)ethyltrimethoxysilane (EEMS); or a mixture thereof.

10. The process of claim 1, wherein the catalyst is selected from Brønsted Acids, Lewis Acids, carbenium ions, onium ions, or a mixture thereof.

11. The process of claim 1, wherein the catalyst is selected from boron trifluoride ($BF_3$); boron trifluoride diethyletherate ($BF_3.OEt_2$); a boron trifluoride complex; Iron(III) chloride ($FeCl_3$); Tin(IV) Chloride ($SnCl_4$); Antimony Pentafluoride ($SbF_5$); Fluorosulphuric acid ($FSO_3H$); Trifluorosulfonic acid ($CF_3SO_3H$); Tetrafluoroborate ($HBF_4$); Scandium Triflate ($Sc(OTf)_3$); Ytterbium Triflate ($Yt(OTf)_3$); Trimethylsilyl trifluoromethanesulphonate (TMSOTf); Stannous octoate ($Sn(Oct)_2$); Sulphuric Acid ($H_2SO_4$); Aluminium chloride ($AlCl_3$); and mixtures thereof.

12. The process of claim 1, wherein the process comprises addition of a carboxylic acid to the reaction mixture prior to addition of catalyst and wherein the material further comprises an organic component formed by the carboxylic acid.

13. The process of claim 12, wherein the carboxylic acid is selected from the group consisting of PCL-diCOOH of formula:

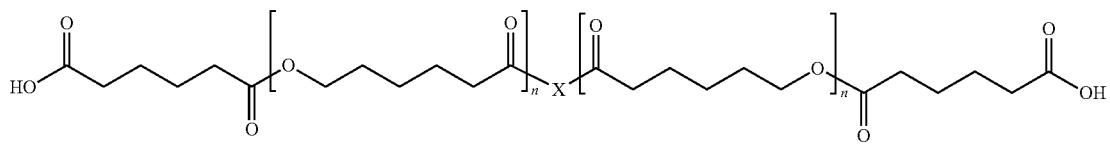

wherein each n is any integer value of 1 or greater, and X is

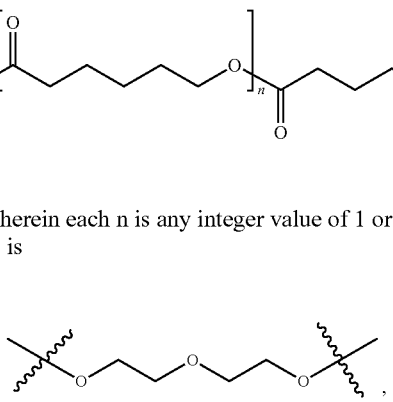

hexadecanedioic acid, hexanedioic acid, benzene-1,2-dicarboxylic acid, benzene-1,3-dicarboxylic acid, benzene-1,4-dicarboxylic acid, propionic acid, poly(ethylene glycol) bis(carboxymethyl) ether, polyglutamic acid, and a mixture thereof.

14. The process of claim 1, wherein the process further comprises addition of one or more oxides, or oxide precursors, to the reaction mixture.

15. The process of claim 1, wherein the monomer is tetrahydrofuran (THF), the epoxide is (3-glycidyloxypropyl) trimethoxysilane (GPTMS), a carboxylic acid is added to the reaction mixture and an additional silica source is added to the reaction mixture.

16. The process of claim 15, wherein the carboxylic acid is PCL-diCOOH;

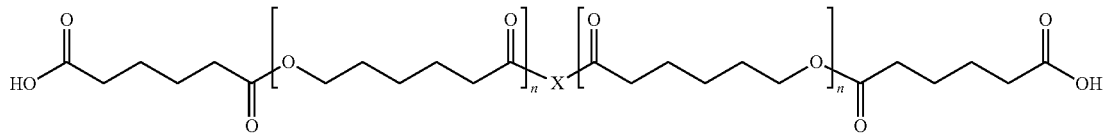

wherein X is

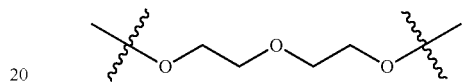

and each n is any integer value of 1 or greater, and the additional silica source is tetraethoxysilane (TEOS), and wherein the proportion of TEOS with respect to PCL-diCOOH is from 0 to 95% w/w.

17. The process of claim 1, wherein the process further comprises 3D-printing of the material.

18. The process of claim 17, wherein the process further comprises storing the material at a temperature below −40° C.

* * * * *